United States Patent
Takeuchi et al.

(10) Patent No.: US 11,829,716 B2
(45) Date of Patent: Nov. 28, 2023

(54) SUGGESTION OF AN OUTPUT CANDIDATE

(71) Applicant: INTERNATIONAL BUSINESS MACHINES CORPORATION, Armonk, NY (US)

(72) Inventors: Emiko Takeuchi, Tokyo (JP); Yoshinori Kabeya, Kawasaki (JP); Daisuke Takuma, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 16/562,964

(22) Filed: Sep. 6, 2019

(65) Prior Publication Data

US 2021/0073331 A1    Mar. 11, 2021

(51) Int. Cl.
 *G06F 40/242* (2020.01)
 *G06F 16/332* (2019.01)
 *G06F 16/335* (2019.01)
 *G06F 40/284* (2020.01)

(52) U.S. Cl.
 CPC .......... *G06F 40/242* (2020.01); *G06F 16/337* (2019.01); *G06F 16/3326* (2019.01); *G06F 40/284* (2020.01)

(58) Field of Classification Search
 CPC .. G06F 40/242; G06F 16/3326; G06F 16/337; G06F 40/274; G06F 40/284; G06F 3/0237; G06F 40/211; G06F 40/20; G06F 16/30
 See application file for complete search history.

(56) References Cited

U.S. PATENT DOCUMENTS

| | | | | |
|---|---|---|---|---|
| 5,649,221 | A | * | 7/1997 | Crawford .............. G06F 16/374 704/10 |
| 9,026,430 | B2 | | 5/2015 | Xiong |
| 9,411,906 | B2 | | 8/2016 | Wu |
| 2002/0026456 | A1 | * | 2/2002 | Bradford ................. G06F 40/30 715/210 |
| 2007/0067294 | A1 | * | 3/2007 | Ward .................. G06F 16/9535 |
| 2008/0103762 | A1 | * | 5/2008 | Kirshenbaum ......... G06F 40/30 704/10 |
| 2013/0173252 | A1 | | 7/2013 | Xiong |

(Continued)

FOREIGN PATENT DOCUMENTS

CN    112462952 A  *  3/2021  ......... G06F 16/3326

OTHER PUBLICATIONS

Exalead, "Search-Based Applications (SBAs), A Revolutionary Model that Reduces IT Costs and Complexity While Greatly Improving Information Access", 2010, pp. 1-8.

(Continued)

*Primary Examiner* — Sanchita Roy
(74) *Attorney, Agent, or Firm* — Anthony M. Pallone

(57) ABSTRACT

The present invention may be a method, a computer system, and a computer program product for suggesting an output candidate. The method comprises receiving a user input; selecting a corpus containing an expression similar to the user input among a plurality of corpuses; finding, in the user input, a seed word that may be present in a definition statement of an entry in a dictionary; identifying, in the dictionary, an entry of a definition statement containing the seed word or within a threshold similarity to the seed word with reference to the selected corpus; and suggesting the identified entry as an output candidate.

20 Claims, 18 Drawing Sheets

(56) References Cited

U.S. PATENT DOCUMENTS

| | | | |
|---|---|---|---|
| 2015/0006149 A1* | 1/2015 | Bonas | G06F 40/247 704/9 |
| 2015/0220547 A1* | 8/2015 | Wu | G06F 16/90324 707/748 |
| 2015/0242391 A1 | 8/2015 | Goel | |
| 2016/0364380 A1 | 12/2016 | Korn | |

OTHER PUBLICATIONS

Kauffman, "A Better Authoring Experience for Headless CMS's", https://www.bloomreach.com/en/blog/2018/03/a-better-authoring-experi . . . , Mar. 7, 2018, pp. 1-4.

Mell et al., "The NIST Definition of Cloud Computing", National Institute of Standards and Technology, Special Publication 800-145, Sep. 2011, pp. 1-7.

Yo Okuno, Graham Neubig, Masato Ogino: Natural Language Basics and Technology: ISBN: 9784798128528, 2016, pp. 1-4.

* cited by examiner

Fig. 5

| User input | Estimated user level | Candidate |
|---|---|---|
| 521 Mount Yarigatake in autumn - The sea of clouds overlooked from the famous mountain penetrating heaven was a breathtaking beauty. | 522 2 | 523 Precipitous: Level 3 |
| 531 Especially in the sunset, the spectacular scenery where carpets of clouds are dyed red under one's eyes and the azure sky and mountains spreading endlessly was... | 532 2 | 533 Blue sky spreading endlessly: Level 3 |

501

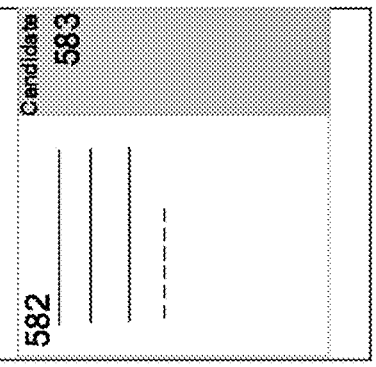

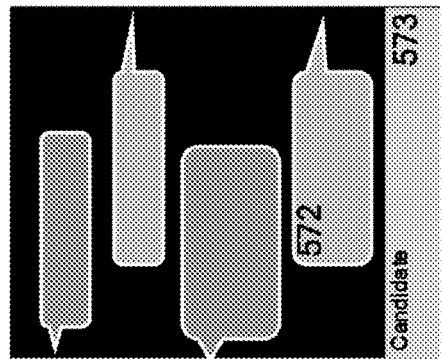

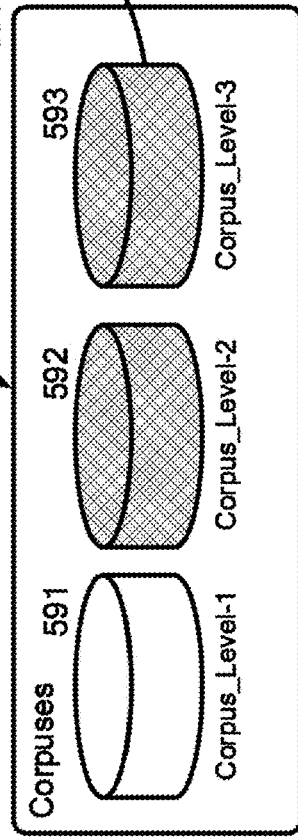

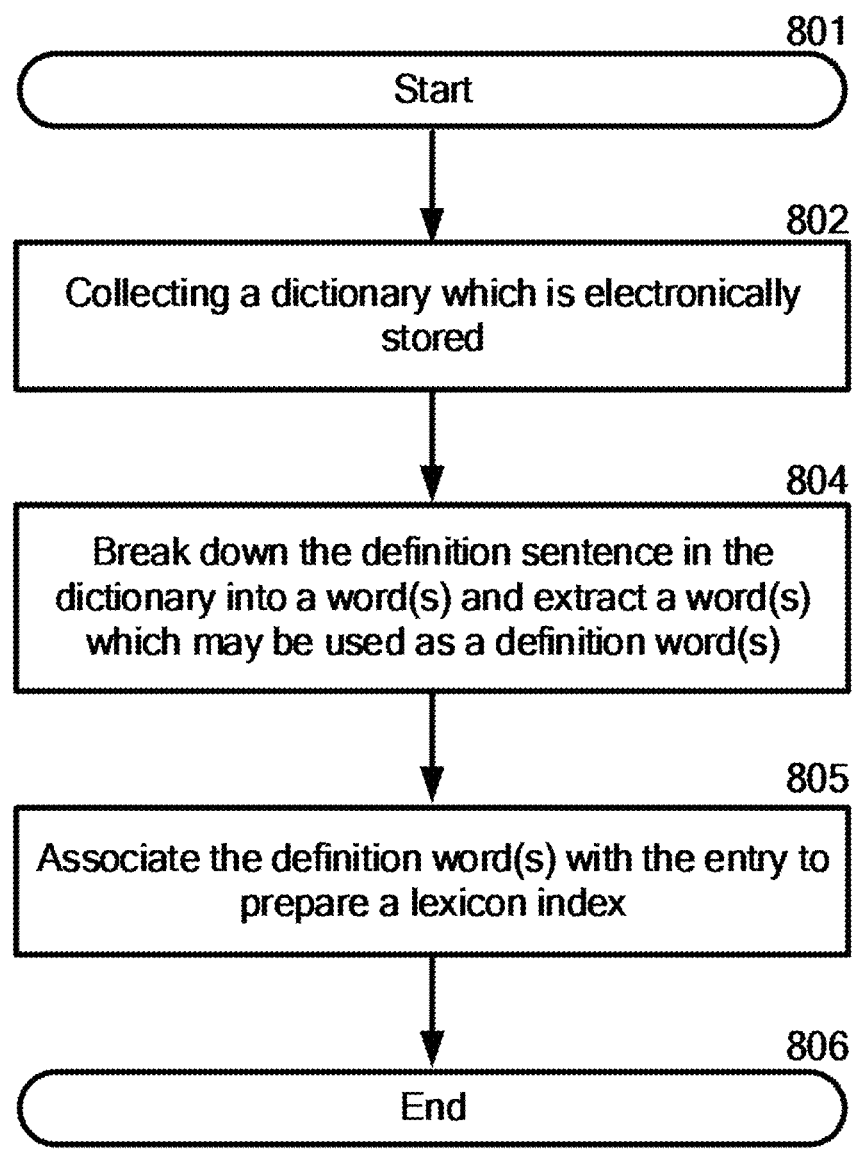

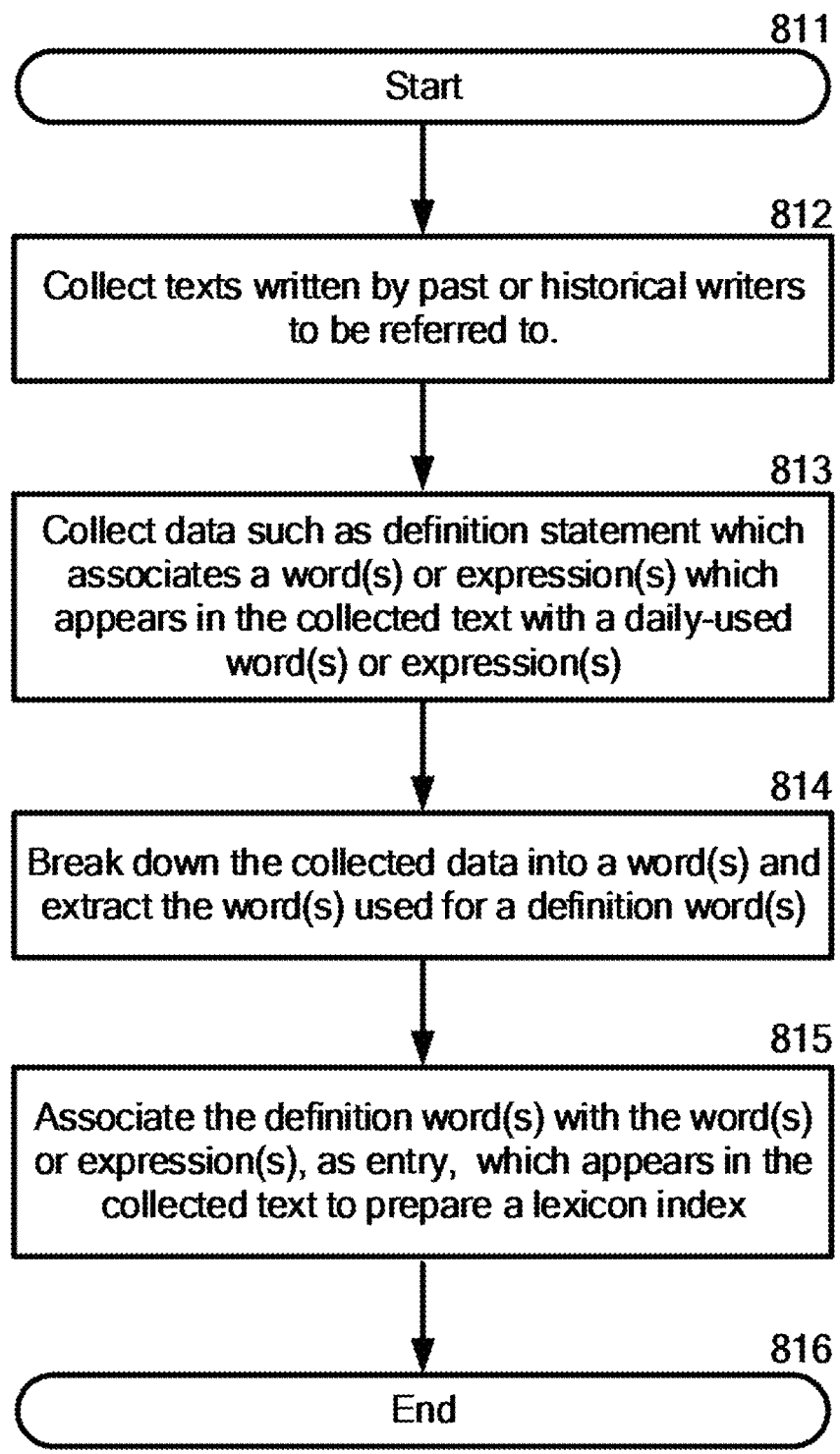

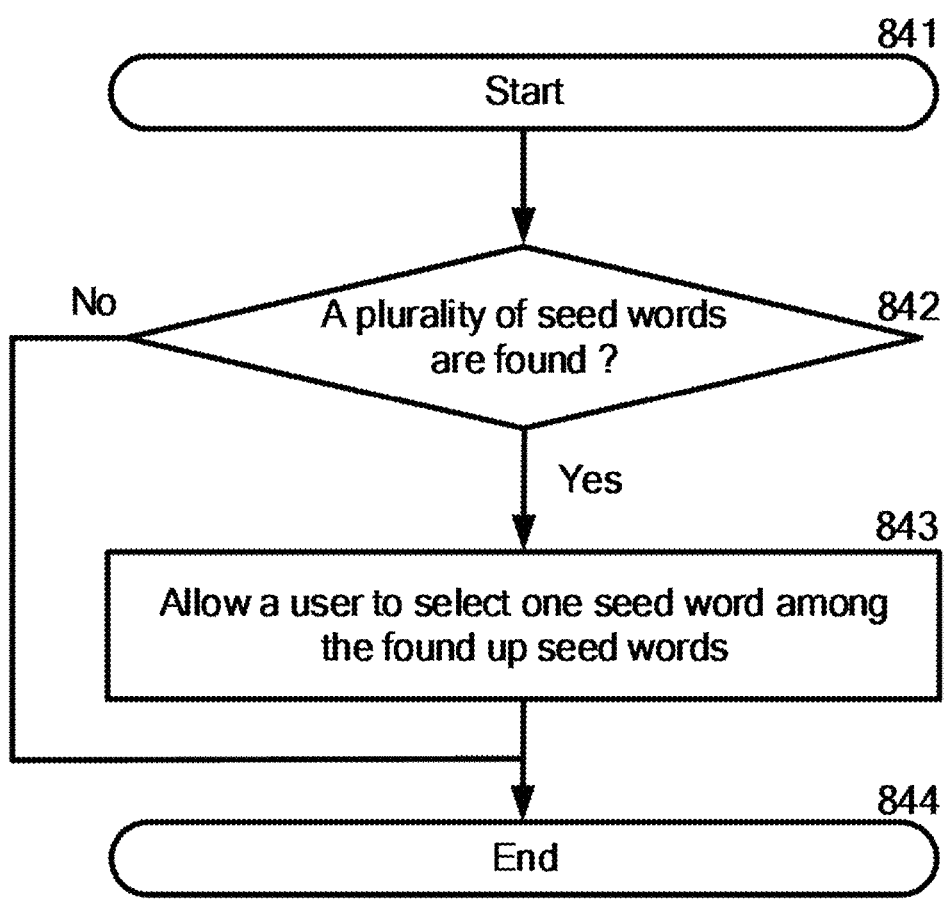

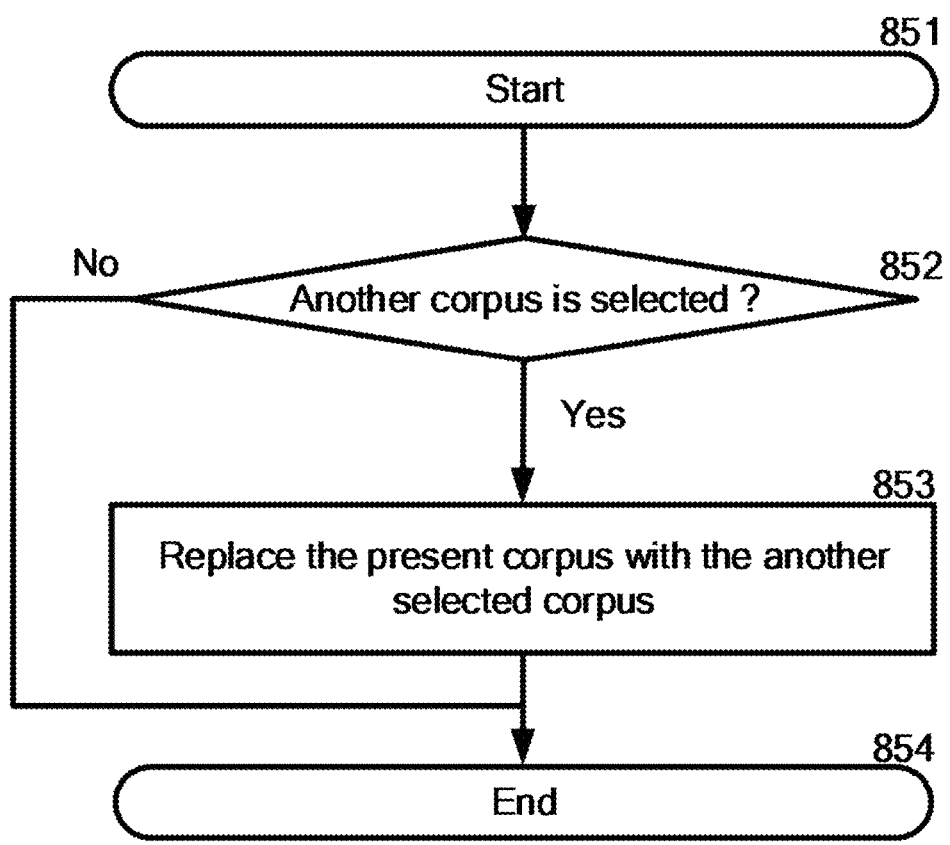

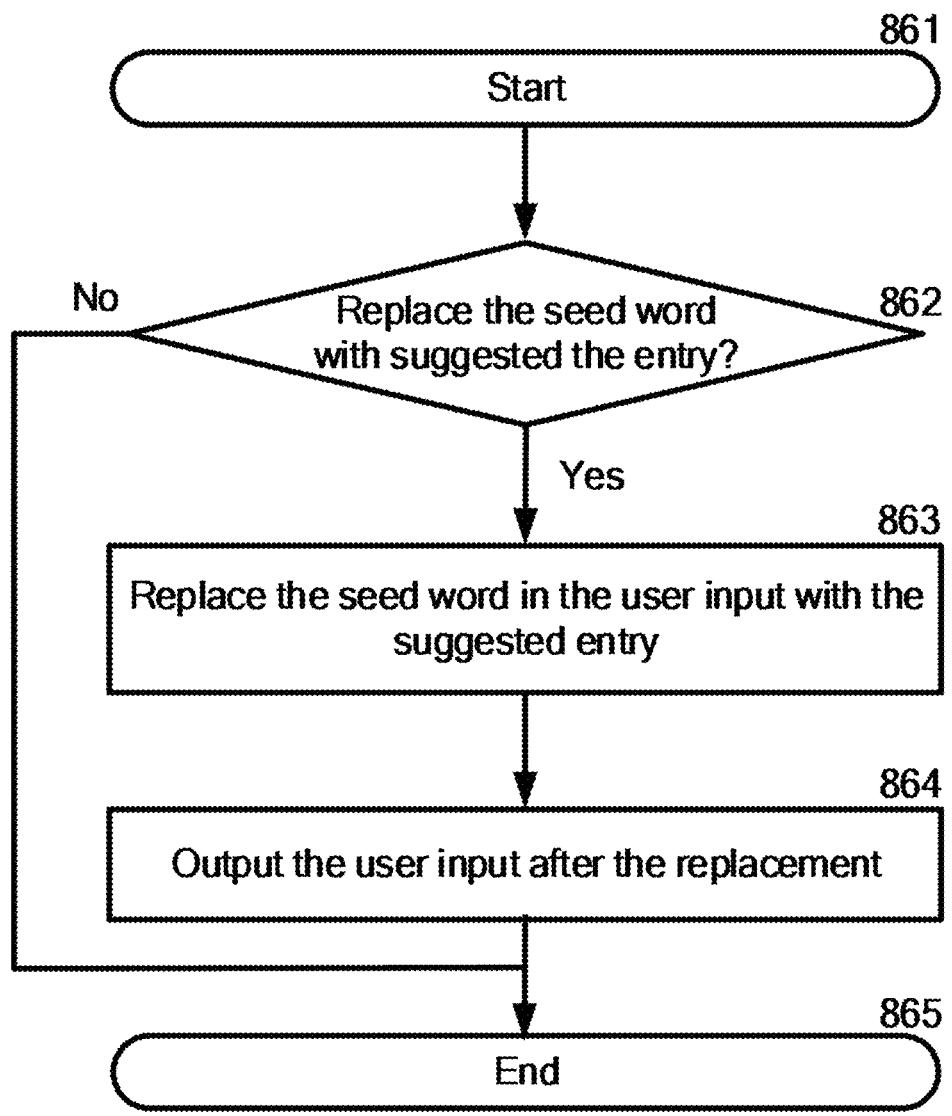

SUGGESTION OF AN OUTPUT CANDIDATE

The present invention relates generally to input support functions, and more particularly to a technique for suggesting an output candidate.

BACKGROUND

Conventional input-assistance functions that have been proposed are limited to, for example, the following functions: "learning functions", "prediction functions", "spelling correction", and "kana-to-kanji conversion functions", which is particular to Japanese characters. The "learning functions" output, as a candidate, preferentially words previously input by a user. The "prediction functions" predict a word or expression that complements the word which is now being input or that will follow the word which is now being input. The "spelling correction" (also known as "spell checker") checks for misspellings in a text. The "kana-to-kanji conversion functions" is used for the Japanese input method's (JIM) Kana-to-Kanji conversion (KKC) technology which is based on the fact that every Kanji character or set of Kanji character has a phonetic sound or sounds that can be expressed by Katakana or Hiragana characters.

SUMMARY

Aspects of the present invention are directed to a method, system, and computer program product for suggesting an output candidate. According to an aspect of the present invention, a computer-implemented method for suggesting an output candidate is provided. The method comprises receiving a user input; selecting a corpus containing an expression similar to the user input among a plurality of corpuses; finding, in the user input, a seed word that may be present in a definition statement of an entry in a dictionary; identifying, in the dictionary, an entry of a definition statement containing the seed word or within a threshold similarity to the seed word with reference to the selected corpus; and suggesting the identified entry as an output candidate.

According to another aspect of the present invention, a system, such as a computer system, is provided. The system may include one or more computer processors, and a memory storing a program which performs, on the processor, an operation for performing the method disclosed herein.

According to further another aspect of the present invention, a computer program product is provided. The computer program product may comprise a computer readable storage medium having program instructions embodied therewith. The program instructions are executable by a computer to cause a computer system to perform the method disclosed herein.

BRIEF DESCRIPTION OF THE DRAWING

The disclosure will provide details in the following description of preferred embodiments with reference to the following figures. The figures are not necessarily to scale. The figures are merely schematic representations, not intended to portray specific parameters of the invention. The figures are intended to depict only typical embodiments of the invention. In the figures, like numbering represents like elements.

FIG. 5 illustrates a diagram of suggesting an output candidate on the basis of an estimated user level, in accordance with an embodiment of the present invention.

FIG. 8A illustrates a flowchart depicting a process for preparing a lexicon index from a dictionary, in accordance with an embodiment of the present invention.

FIG. 8B illustrates a flowchart depicting process for preparing a lexicon index from texts of past or historical writers to be referred to, in accordance with an embodiment of the present invention.

FIG. 8E illustrates a flowchart depicting a process for allowing a user to select one seed word among a plurality of seed words which was found in a user input, in accordance with an embodiment of the present invention.

FIG. 8F illustrates a flowchart depicting a process for suggesting an output candidate when another corpus is selected, in accordance with an embodiment of the present invention.

FIG. 8G illustrates a flowchart depicting a process for replace a seed word that present in a user input with an output candidate or a suggested entry.

DETAILED DESCRIPTION

Figure 1:
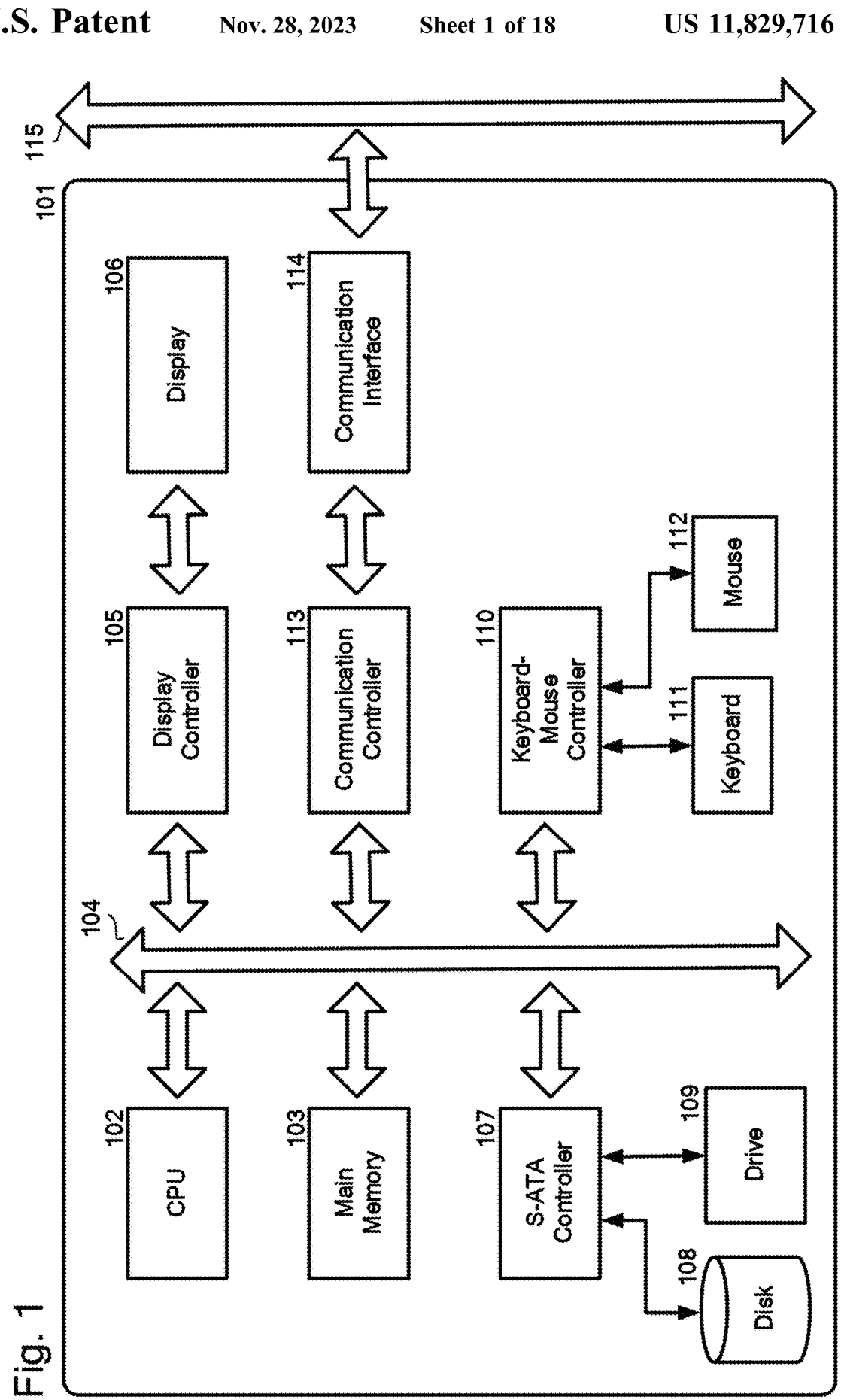
FIG. 1 illustrates an exemplified system architecture of a system which may be used in accordance with an embodiment of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to sensuously understand the embodiments disclosed herein.

As will be appreciated by those of skill in the art, an embodiment of the present invention may be embodied as a method, a computer system, or a computer program product. Accordingly, an embodiment of the present invention may take the form of an entirely hardware-based embodiment, an entirely software-based embodiment, including, for example, firmware, resident software ad micro-code, and the like, or may take the form of an embodiment combining software-based and hardware-based aspects, which may be collectively referred to herein as a "circuit," a "module," or a "system".

As used herein, the expression "a/one" should be understood as "at least one." The expression "comprise(s)/comprising a/one" should be understood as "comprise(s)/comprising at least one." The expression "comprise(s)/comprising" should be understood as "comprise(s)/comprising at least." The expression "/" should be understood as "and/or."

To define more clearly terms as used herein, exemplified definitions of the terms are provided hereinafter, this should be interpreted broadly as known to a person skilled in the art or a technical field to which the present invention pertains.

As used herein, the term "a corpus" may contain a large and structured set of texts. Any known corpus or newly created corpus can be used in an embodiment of the present invention.

As used herein, the term "a seed word" may refer to any word, term, phrase or expression which may used for searching for a neighboring word of the seed word or a neighboring word of a lower, upper or sibling concept of the seed word; or a word which may be used for searching for an entry in a dictionary.

As used herein, the term "a neighboring word" may refer to any word, term, phrase or expression which may be associated with a seed word, for example, in view of a meaning or a frequency of simultaneous appearance. A neighboring word may be, for example, but not limited to, a neighboring word of the seed word or a neighboring word of a lower, upper or sibling concept of the seed word. A neighboring word may be found from any context, for example, a dictionary, a corpus, or an internet or intranet. A neighboring word can be used for expanding a scope of a seed word. For example, a neighboring word of the seed word may be a word within a threshold distance, such as character counts or words, from the seed word.

As used herein, the term "a dictionary" may refer to any resource that has at least one set of an entry and a definition statement of the entry or that has entries and definition statements of the entries. The dictionary may be any electronic dictionary such as a language dictionary or an encyclopedia. The dictionary may be available in a market, any dictionary on the Internet, or any dictionary on the Intranet, or any dictionary used in a limited environment, such as in a certain organization, for example, a company, department, school or government. A type of the dictionary may not be limited when an embodiment of the present invention is implemented.

As used herein, the term "an entry" may refer to an index in a dictionary, for example, but not limited to, a word, a term, a phrase, an expression, or a pictograph such as emotions or emojis.

As used herein, the term "a definition statement" may refer to an explanation of an index. The explanation may be made using a general word, a general expression or a combination thereof. A definition statement may include, for example, but not limited to, a sentence, list of words and an example sentence.

The idea of an embodiment of the present invention is based on the following perceptions.

There is a need to facilitate searching for one single word which unequivocally conveys a vague or ambiguous idea or thought in a conversation or dialogue. For example, at the time when one proposes brainstorming in chatting; at the time when one proposes a sophisticated, elegant or refined word "precipitous" to a copywriter or a writer as an expression for describing a mountain; and at the time when one proposes a pictogram that conforms to the context, for example, the context is "My eldest son finally chose the high school he's going to attend." and the proposed pictogram is a bunch of flowers.

Further, there is a need to create unique sentences with more academic or sophisticated words, terms, phrases, or expressions which may have the same meaning as input strings.

Moreover, there is a need to create expressions and texts in a particular style or taste using phrases and expressions that were actually used by writers in the past.

Hereinafter, the various embodiments of the present invention will be described with reference to the accompanying FIGS. 1 to 6, FIGS. 7A to 7B, FIGS. 8A to 8G and FIG. 9.

With reference now to FIG. 1, FIG. 1 illustrates an exemplified system architecture of a system, such as a computer system, which may be used in accordance with an embodiment of the present invention.

A system (101) may be, for example, but is not limited to, a desktop, a laptop, a notebook or a server computer. The server computer may be, for example, but is not limited to, a workstation, a rack-mount type server, a blade type server, a mainframe server, or a cloud server and may run, for example, a hypervisor for creating and running one or more virtual machines. The system (101) may comprise one or more CPUs (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, Sempron™ series or the Ryzen™ series of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", "Sempron" and "Ryzen" are trademarks of Advanced Micro Devices, Inc. in the United States, other countries, or both).

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. The display may have a touch screen or a non-touch screen. The display may be for example, but not limited to, a LCD, PDP, OEL or a projection type display. A disk (108) such as a hard disk or a solid state drive, SSD, and a drive (109) such as a CD, a DVD, or a BD (Blu-ray disk) drive may be connected to the bus (104) via a SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the system (101) to a communication line (115), and may provide a network interface layer to the TCP/IP communication protocol of a communication function of the operating system of the system (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

Figure 2:
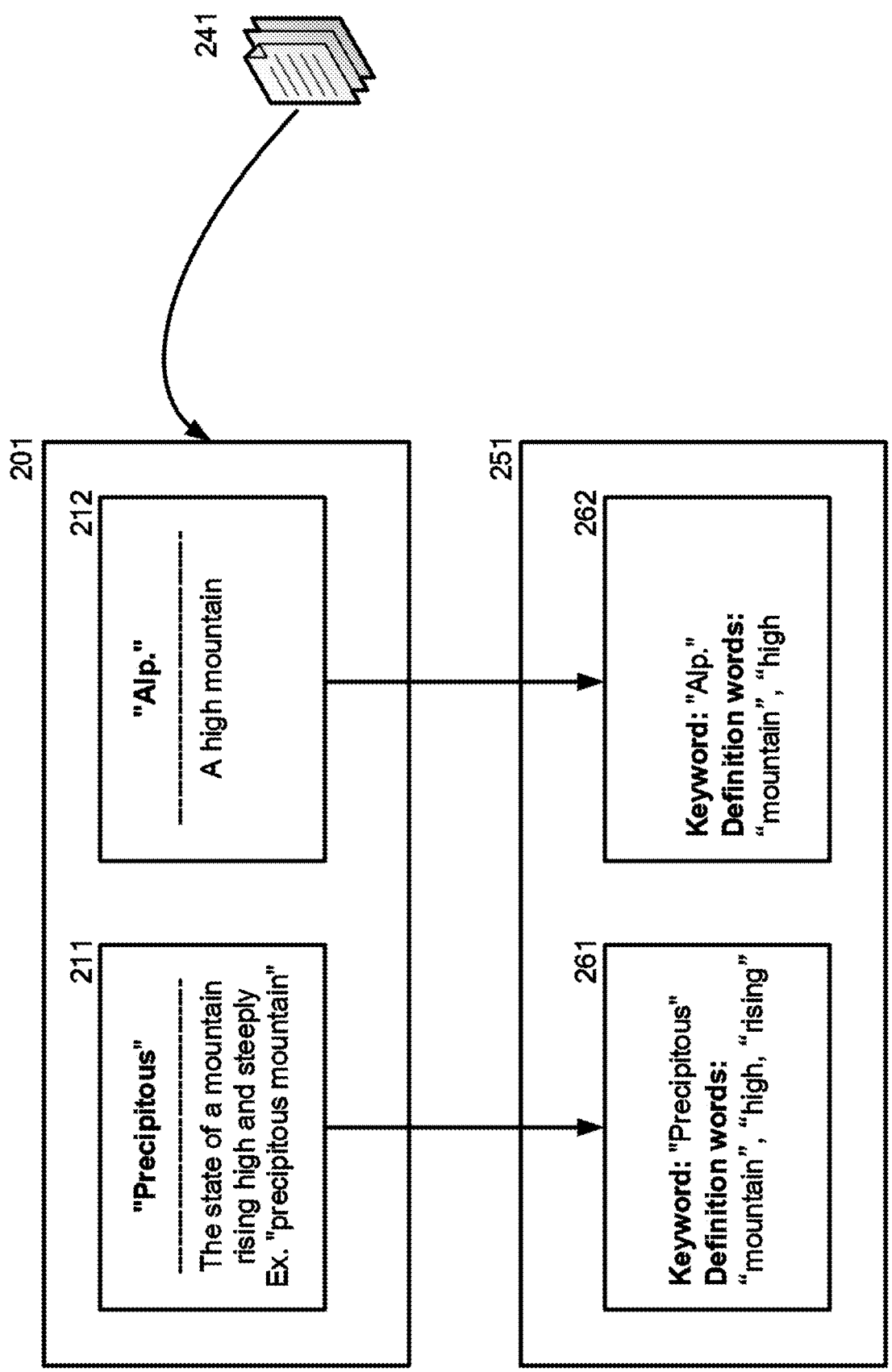
FIG. 2 illustrates a diagram of preparing a lexicon index from a dictionary, in accordance with an embodiment of the present invention.

With reference now to FIG. 2, FIG. 2 illustrates a diagram of preparing a lexicon index from a dictionary, in accordance with an embodiment of the present invention.

FIG. 2 illustrates a part (201) of a dictionary (241) mentioned above. The part (201) of the dictionary (241) has two entries "Precipitous" (211) and "Alp." (212).

The entry "Precipitous" (211) has or is associated with a definition statement, "The state of a mountain rising high and steeply.", and an example sentence of this entry, "Ex. "precipitous mountain".

The entry "Alp." (212) has or is associated with a definition statement, "A high mountain".

The definition statement "The state of a mountain rising high and steeply." of the entry "Precipitous" (211) is broken down into a word(s) using, for example, a text mining technology to extract a definition word(s). The definition words taken up, or identified, from the aforesaid definition statement may be "mountain", "high" and "rising".

The aforesaid definition words "mountain", "high" and "rising" is associated with the entry "Precipitous" (211) as a keyword to prepare a set (261) of the keyword and the definition words.

The definition statement "A high mountain" of the entry "Alp." (212) is broken down into a word(s) using, for example, a text mining technology to extract a definition word(s). The definition words taken up, or identified/extracted, from the aforesaid definition statement may be "mountain" and "high".

The aforesaid definition words "mountain" and "high" is associated with the entry "Alp." (212) as a keyword to prepare a set (262) of the keyword and the definition words.

A lexicon index (251) can include the sets (261 and 262) of the keyword and the definition words. The lexicon index (251) allows reference from a definition word(s) to the keyword.

The generated lexicon index (251) can be used as a kind of dictionary, according to an embodiment of the present invention.

Hereinafter, the term "dictionary" may comprise a lexicon index, such as the generated lexicon index (251).

Figure 3:
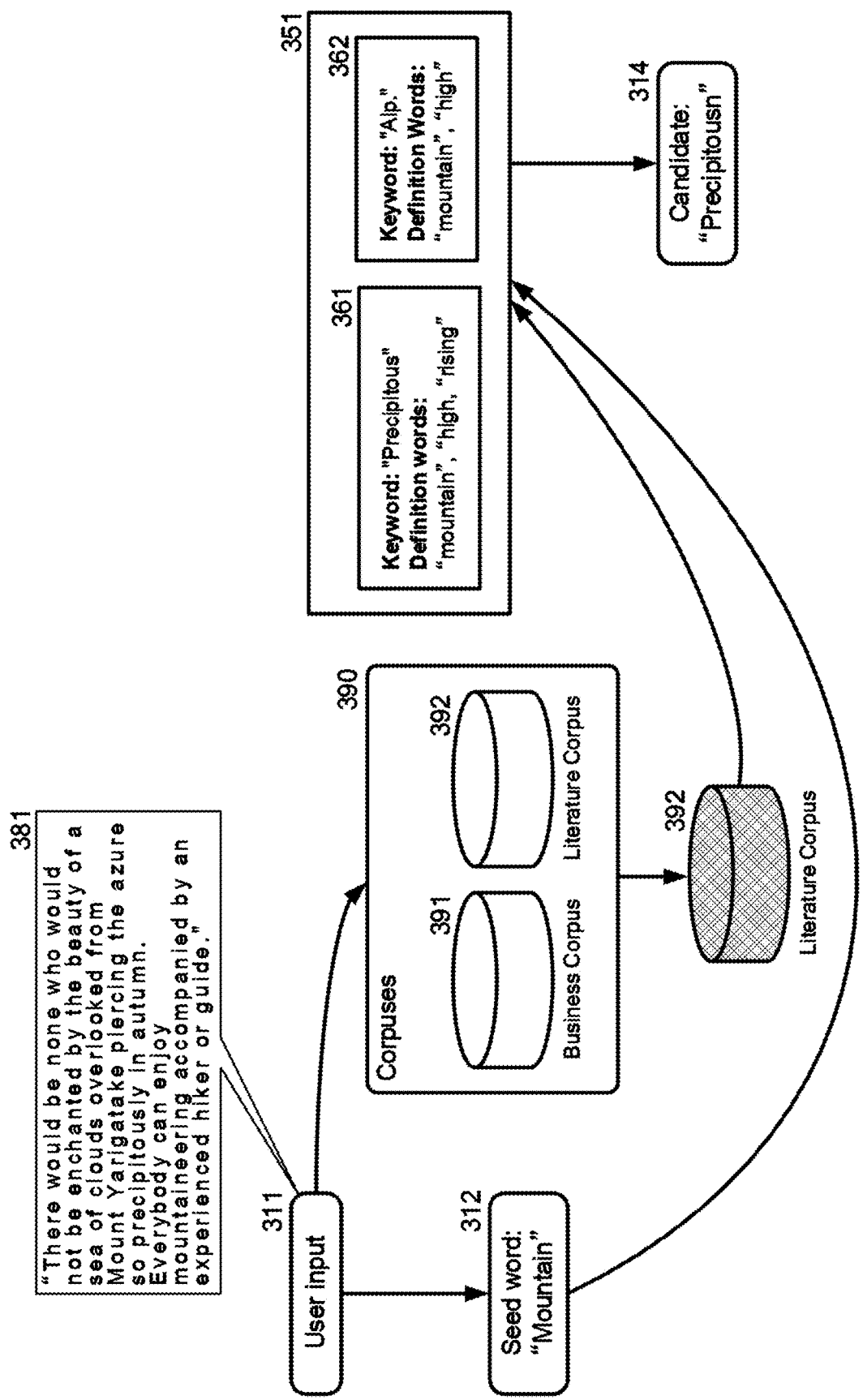
FIG. 3 illustrates a diagram of suggesting an output candidate, on the basis of a seed word which was found in a user input, in accordance with an embodiment of the present invention.

With reference now to FIG. 3, FIG. 3 illustrates a diagram of suggesting an output candidate, on the basis of a seed word which was found in a user input, in accordance with an embodiment of the present invention.

Let us suppose that a user inputs "There would be none who would not be enchanted by the beauty of a sea of clouds overlooked from Mount Yarigatake piercing the azure so precipitously in autumn. Everybody can enjoy mountaineering accompanied by an experienced hiker or guide." (381) on a device.

The system receives the aforesaid user input (311) from the device, for example, via an Internet.

In response to receipt of the user input (311), the system selects a corpus containing an expression similar to the user input (311) among a plurality of corpuses (390). The corpuses (390) comprises a business corpus (391) which may be customized or optimized for use in a business situation; and a literature corpus (392) which may be customized or optimized for use in a literature situation. The system analyzes the user input (311) and judges that the user input (311) relates to a literature situation, compared to a business situation. Accordingly, the system selects the literature corpus (392) among the corpuses (390).

The system finds, in the user input (311), a seed word that may be present in a definition statement of an entry in the dictionary (351) which was prepared as seen in FIG. 2. The system finds the word "mountain" as the seed word (312).

After the extraction of the seed word (312), the system extracts, in the dictionary (351), an entry of a definition statement containing the seed word (312) or having a high similarity to the seed word (312). The system extracts the following two sets (361 and 362): the set (361) having the definition word "mountain"; and the set (362) having the definition word "mountain".

The system can suggest the following two keywords as output candidates: the keyword "precipitous" in the taken up set (361); and the keyword "Alp" in the taken up set (362). Alternatively, the system can select a keyword among the two taken up keywords with reference to the literature corpus (392). The keyword "precipitous" is more likely to appear in the literature corpus (392), compared to the keyword "Alp." Accordingly, the system can select the keyword "precipitous" and then suggest the selected keyword "precipitous" as an output candidate.

According to the aforesaid embodiment of the present invention, the device can present more academic or sophisticated phrases or expressions as an output candidate by identifying, based on the user input, a vocabulary level of a user, and thereby makes it possible to use a wide variety of vocabularies, idioms, and phraseology of the text creators, supporting creation of more distinct and characteristic texts.

Further, if the dictionary has more sophisticated or elegant vocabularies and expressions that have the same meaning as input strings in the user input, it is made possible to create expressions and texts in a particular style or taste using phrases and expressions that were actually used by writers who lived in the past.

Further, the aforesaid embodiment is capable of associating words having different vocabulary levels and not appearing in the same sentence such as "high mountain" and "precipitous" with each other in terms of their meanings. The aforesaid embodiment guarantees the "naturalness as a sentence," which has been guaranteed in the traditional scheme based on the probability of concurrence, by comparing the keyword as such of the lexicon with the corpus that is in agreement with the vocabulary level.

Figure 4:
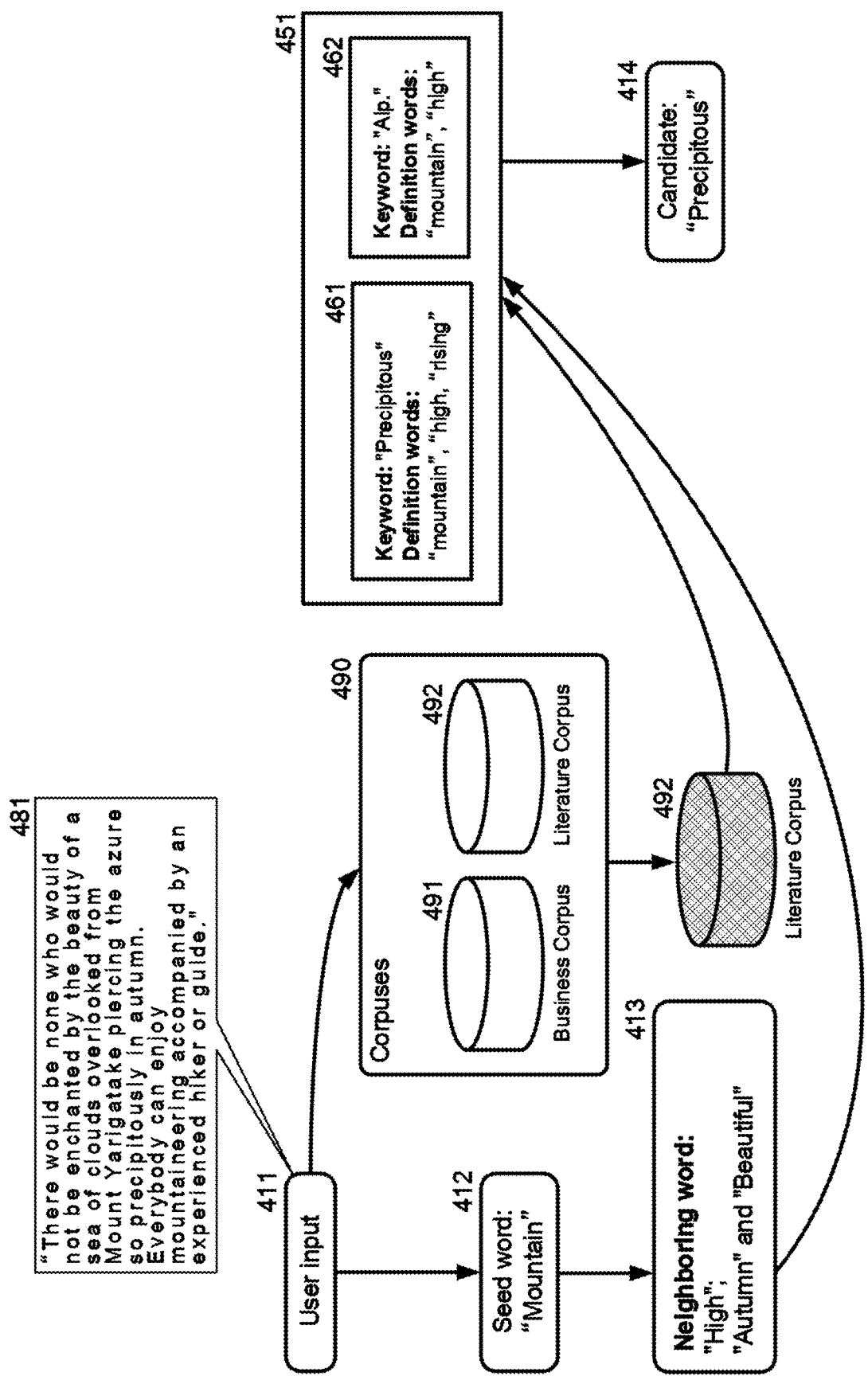
FIG. 4 illustrates a diagram of suggesting an output candidate on the basis of a neighboring word of a seed word which was found in a user input, in accordance with an embodiment of the present invention.

With reference now to FIG. 4, FIG. 4 illustrates a diagram of suggesting an output candidate on the basis of a neighboring word of a seed word which was found in a user input, in accordance with an embodiment of the present invention.

Let us suppose that a user inputs "There would be none who would not be enchanted by the beauty of a sea of clouds overlooked from Mount Yarigatake piercing the azure so precipitously in autumn. Everybody can enjoy mountaineering accompanied by an experienced hiker or guide." (481) on a device.

The system receives the aforesaid user input (411) from the device, for example, via an Internet.

In response to receipt of the user input (411), the system selects a corpus containing an expression similar to the user input (411) among a plurality of corpuses (490). The corpuses (490) comprises a business corpus (491) which may be customized or optimized for use in a business situation and a literature corpus (492) which may be customized or optimized for use in a literature situation. The system analyzes the user input (411) and judges that the user input (411) relates to a literature situation, compared to a business situation. Accordingly, the system selects the literature corpus (492) among the corpuses (490).

The system finds, in the user input (411), a seed word that may be present in a definition statement of an entry in the dictionary (451) which was prepared as seen in FIG. 2. The system finds the word "mountain" as the seed word (412).

After the extraction of the seed word (412), the system further finds a neighboring word of the seed word (412) or a neighboring word of a lower, upper or sibling concept of the seed word (412). The system finds the words "high", "autumn", and "beautiful" as the neighboring words (413) from a dictionary, a corpus, an internet, or intranet.

After the extraction of the seed word (412), the system extracts, in the dictionary (451), an entry of a definition statement containing the neighboring word (413) and the seed word (412). The system extracts the following two sets (461 and 462) using the neighboring word (413) and the seed word (412): the set (461) having the definition words "mountain" and "high" and; and the set (462) having the definition words "mountain" and "high".

The system can suggest the following two keywords as output candidates: the keyword "precipitous" in the taken up set (461); and the keyword "Alp" in the taken up set (462). Alternatively, the system can select a keyword among the two taken up keywords with reference to the literature corpus (492). The keyword "precipitous" is more likely to appear in the literature corpus (492), compared to the keyword "Alp." Accordingly, the system can select the keyword "precipitous" and then suggest the selected keyword "precipitous" as an output candidate.

According to the aforesaid embodiment of the present invention, the device can present more academic or sophisticated phrases or expressions as an output candidate by identifying, based on the user input, a vocabulary level of a user and using a neighboring word of a seed word, and thereby makes it possible to use a wide variety of vocabularies, idioms, and phraseology of the text creators, supporting creation of more distinct and characteristic texts.

With reference now to FIG. 5, FIG. 5 illustrates a diagram of suggesting an output candidate on the basis of an estimated user level, in accordance with an embodiment of the present invention.

In the aforesaid FIGS. 3 and 4, the system selects a corpus containing an expression similar to the user input among a plurality of corpuses (390 and 490). Alternatively, the system may select two or more corpuses among plurality of corpuses provided.

FIG. 5 illustrates three corpuses (590) comprising the following three corpuses: Corpus_Level-1 (591), Corpus_Level-2 (592) and Corpus_Level-3 (593). The numerals, "-1", "-2" and "-3", in these corpuses (590) denote a vocabulary level of a user. The higher the number, the higher the vocabulary level of a user.

In a first embodiment of the present invention, let us suppose that a user inputs, on a device, "Mount Yarigatake in autumn—The sea of clouds overlooked from the famous mountain penetrating heaven was a breathtaking beauty." (521) as seen in the table (501).

The system receives the aforesaid user input from the device, for example, via an Internet.

In response to receipt of the user input (521), the system selects, among a plurality of corpuses (590), one or more corpuses having a vocabulary level similar or above a vocabulary level corresponding to an expression similar to the user input (521). The system analyzes the user input (521) and judges that the user input (521) has an estimated user level "2" (522). Therefore, the system selects, among the corpuses (590), Corpus_Level-2 (592) and Corpus_Level-3 (593) which have a vocabulary level similar or above a vocabulary level corresponding to an expression similar to the user input (521).

The system finds, in the user input (521), a seed word that may be present in a definition statement of an entry in the dictionary. The system finds the word "penetrating heaven" as the seed word.

After the extraction of the seed word, the system extracts, in the dictionary, an entry of a definition statement containing the seed word or having a high similarity to the seed word with reference to Corpus_Level-2 (592) and Corpus_Level-3 (593). The system can suggest as an output candidate (523), the keyword "precipitous" which may appear in Corpus_Level-3 (593).

In a second embodiment of the present invention, let us suppose that a user inputs, on a device, "Especially in the sunset, the spectacular scenery where carpets of clouds are dyed red under one's eyes and the azure sky and mountains spreading endlessly was . . . " (531) as seen in the table (501).

The system receives the aforesaid user input (531) from the device, for example, via an Internet.

In response to receipt of the user input (531), the system selects, among a plurality of corpuses (590), one or more corpuses having a vocabulary level similar or above a vocabulary level corresponding to an expression similar to the user input (531). The corpuses (590) comprise the following three corpuses: Corpus_Level-1 (591), Corpus_Level-2 (592) and Corpus_Level-3 (593). The numerals, "-1", "-2" and "-3", in these corpuses (590) denote a vocabulary level of a user. The higher the number, the higher the vocabulary level of a user. The system analyzes the user input (531) and judges that the user input (531) has an estimated user level "2" (532). Therefore, the system selects, among the corpuses (590), Corpus_Level-2 (592) and Corpus_Level-3 (593) which have a vocabulary level similar or above a vocabulary level corresponding to an expression similar to the user input (531).

The system finds, in the user input (531), a seed word that may be present in a definition statement of an entry in the dictionary. The system finds the word "spreading endless" as the seed word.

After the extraction of the seed word, the system extracts, in the dictionary, an entry of a definition statement containing the seed word or having a high similarity to the seed word with reference to Corpus_Level-2 (592) and Corpus_Level-3 (593). The system can suggest as an output candidate (533), the keyword "blue sky spreading endlessly" which may appear in Corpus_Level-3 (593).

In the aforesaid embodiment, Corpus_Level-2 (592) and Corpus_Level-3 (593) which have a vocabulary level similar or above a vocabulary level corresponding to an expression similar to the user input (531) are used. In an alternative embodiment, Corpus_Level-3 (593) which has a vocabulary level below a vocabulary level corresponding to an expression similar to the user input (531) can be used.

FIG. 5 further illustrates examples of a screen on which an output candidate is displayed.

The screen (571) shows an example of a chat software running on a device where a user makes a chat with another person through the chat software. When the user inputs the sentence (572) such as the user input (521 and 531) on the chat software, the device may show an output candidate such as the output candidate (523 and 533) on a box (573).

The screen (581) shows an example of a word processor software, such as a document generation App, running on a device where a user creates a sentence on the word processor software. When the user inputs the sentence (582) such as the user input (521 and 531) on the word processor software, the device may show an output candidate such as the output candidate (523 and 533) on a box (583).

Figure 6:
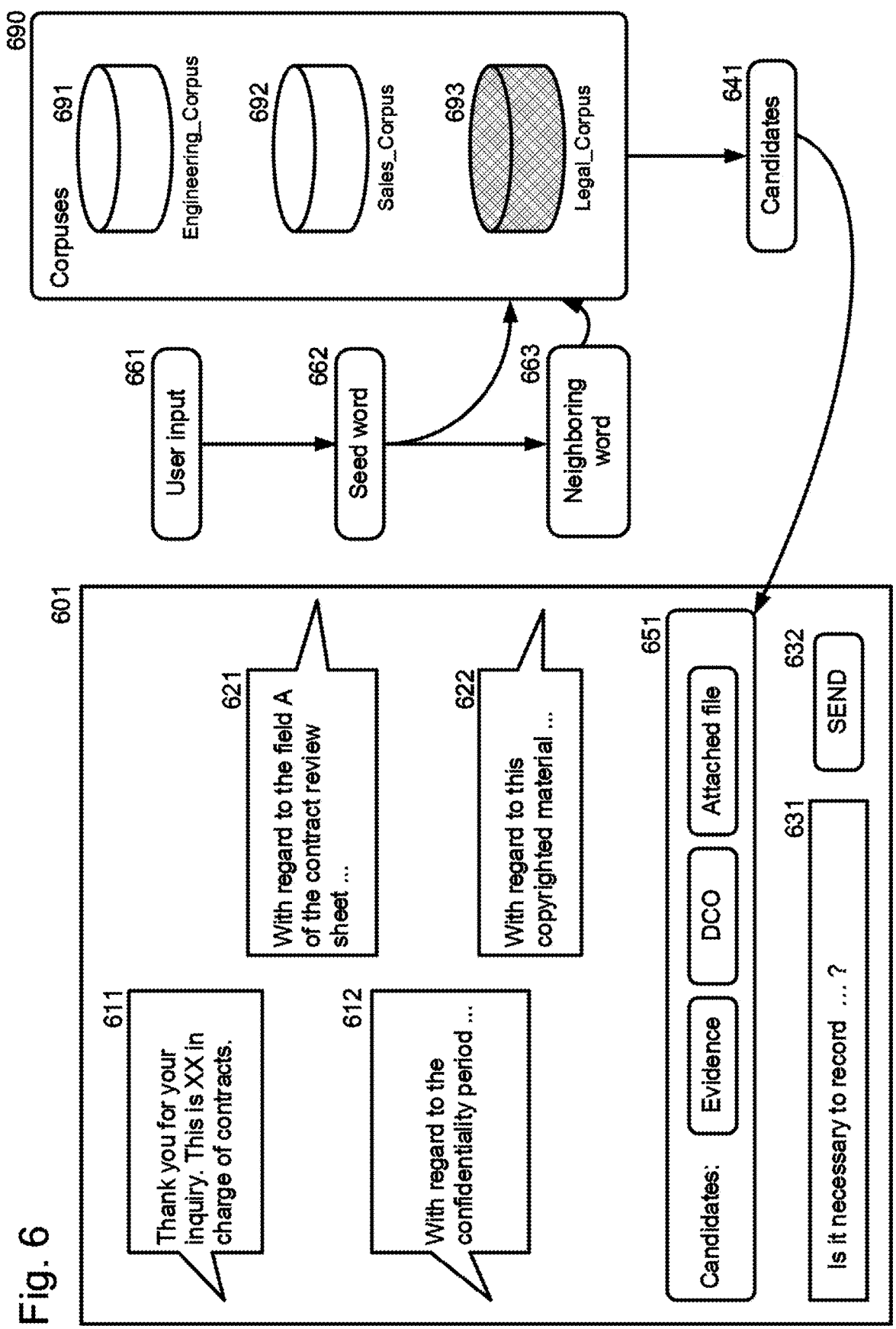
FIG. 6 illustrates a diagram of suggesting a plurality of output candidates on the basis of an estimated user level, in accordance with an embodiment of the present invention.

With reference now to FIG. 6, FIG. 6 illustrates a diagram of suggesting a plurality of output candidates on the basis of an estimated user level, in accordance with an embodiment of the present invention.

In the aforesaid FIGS. 3 and 4, the system suggests one or more output candidates or one output candidate selected by a system. Alternatively, the system suggests a plurality of output candidates and allows a user to select one output candidate.

FIG. 6 illustrates three corpuses (690) comprising the following three corpuses: Engineering_Corpus (691) which may be customized or optimized for an engineering field; Sales_Corpus (692) which may be customized or optimized for a sales field; and Legal_Corpus (693) which may be customized or optimized for a legal field.

Let us suppose that a user starts a chat with a coworker such as contract staff through a chat software. The screen (601) shows chat interactions between the user and the coworkers. The chats done by the user are shown in the right boxes (621 and 622) and the chats done by the coworkers are shown in the left boxes (611 and 612).

First, the user entered the sentence "With regard to the field A of the contract review sheet . . . " (621) and subsequently the sentence "With regard to this copyrighted material . . . " (622) on a device.

Next, the user is now entering the sentence "Is it necessary to record . . . ?" (631).

The system receives the aforesaid user input (631) as a newest user input (661) from the device, for example, via an Internet.

In response to receipt of the user inputs (621, 622 and 631), the system selects a corpus containing an expression similar to the user inputs (621, 622 and 631) among a plurality of corpuses (690). The system analyzes the user inputs (621, 622 and 631) and then extracts the terms, "contract" and "copyright". The system then judges from the taken up terms that the user inputs (621, 622 and 631) relates to a legal field, compared to an engineering field and a sales field. Accordingly, the system selects the Legal_Corpus (693) among the corpuses (690).

The system may use also the inputs (611 and 612) from the coworker to judge which corpus is to be selected.

The system finds, in the user input (661), a seed word that may be present in a definition statement of an entry in the dictionary. The system finds the terms "necessary" and "record" as the seed words (662).

The system may further find a neighboring word (663) of these seed words (662), if necessary or if required.

After the extraction of the seed word (662), the system extracts, in the dictionary, an entry of a definition statement containing the seed word (662) or having a high similarity to the seed word (662). The system extracts, on the basis of the seed word (662), "record", the following three keywords as output candidates (641): "Evidence", "DCO" (DCO: Developer's Certificate of Origin) and "Attached file" and then sends these output candidates (641) to the device in order to suggest these output candidates (641) to the user.

Alternatively, the system extracts, in the dictionary, an entry of a definition statement containing the neighboring word (663) and optionally the seed words (662) or having a high similarity to the neighboring word (663) and optionally the seed words (662).

After the receipt of these output candidates (641), the device displays these received output candidates (651) on a display.

The device allows the user to select an output candidate among these output candidates (651).

During input of the sentence (631), the user can select a candidate among these output candidates (651) and then the selected candidate is copied to the sentence that the user is now entering. After the user finishes entering the sentence including the selected output candidate, the user may press the icon "SEND" (632) to upload this sentence to the chat system.

According to the aforesaid embodiment of the present invention, the user can input a sophisticated, elegant or refined word using the output candidates. Accordingly, the aforesaid embodiment makes it possible for the user to use a wide variety of vocabularies, idioms, and phraseology of the text creators, supporting creation of more distinct and characteristic texts.

Figure 7A:
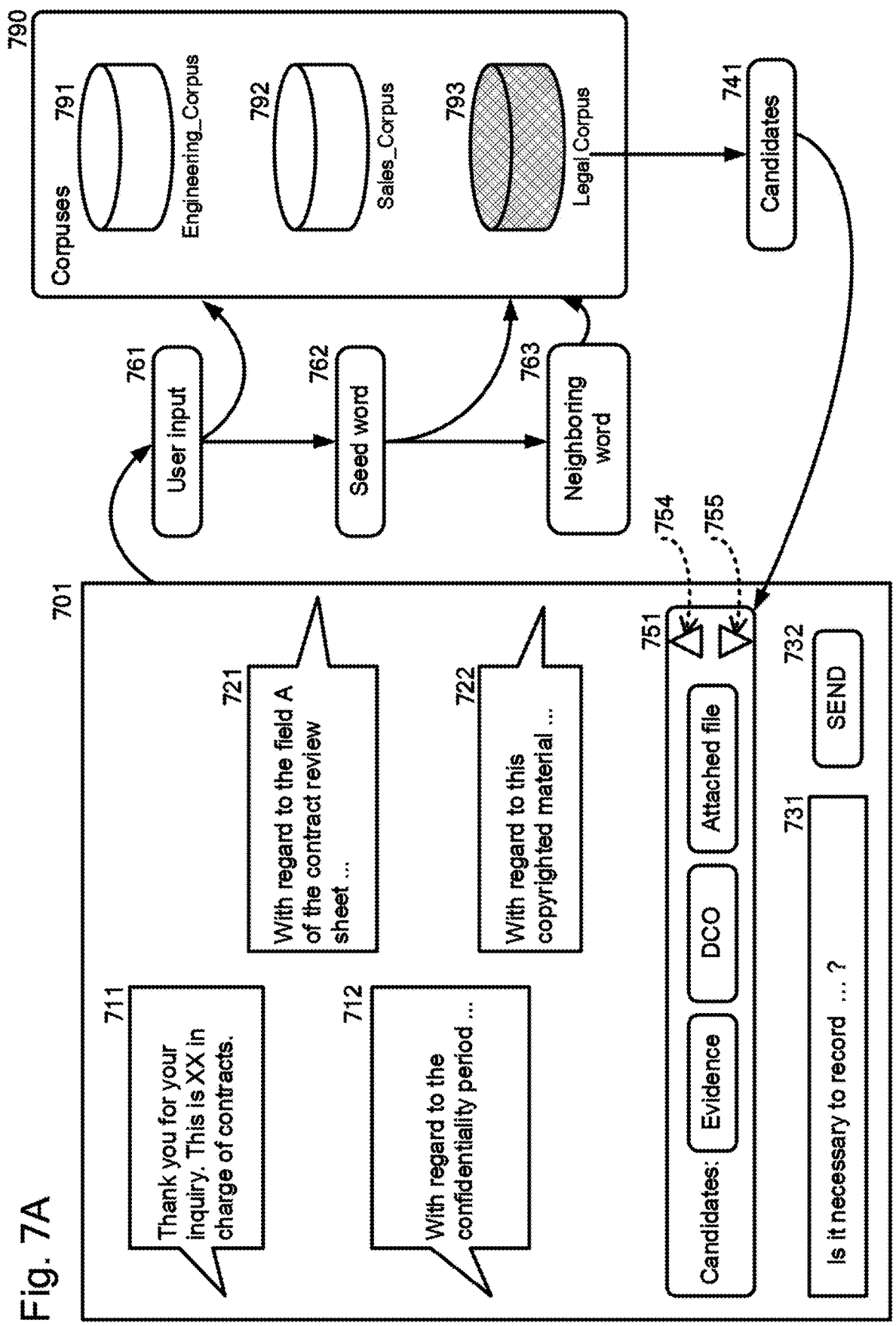
FIG. 7A illustrates a diagram of suggesting a plurality of output candidates in an example of chatting, in accordance with an embodiment of the present invention.

With reference now to FIG. 7A, FIG. 7A illustrates a diagram of suggesting a plurality of output candidates in an example of chatting, in accordance with an embodiment of the present invention.

The diagram illustrated in FIG. 7 is different from that illustrated in FIG. 8 in that the user can intentionally select or change a corpus to be used.

Let us suppose that the user is now entering the sentence "Is it necessary to record ?" (731).

As similar manner described in FIG. 6, in response to the user input (731), the system prepares and then suggests the following three keywords as output candidates (741): "Evidence", "DCO" and "Attached file".

The system sends these output candidates (741) to the device. After the receipt of these output candidates (741), the device displays these received output candidates (751) on a display. Further, the device displays icons (754 and 755) for selecting or changing a corpus to be used among corpuses (790).

In a case where the user pushes the icon (754), the device notifies the system that the corpus to be used is to be changed. In response to receipt of the notification, the system changes the present corpus, i.e. Legal_Corpus (793), to Sales_Corpus (792) and then Sales_Corpus (792) is used for suggesting an output candidate.

In a case where the user pushes the icon (755), the device notifies the system that the corpus to be used is to be changed. In response to receipt of the notification, the system changes the present corpus, i.e. Legal_Corpus (793), to Engineering_Corpus (791) and then Engineering_Corpus (791) is used for suggesting an output candidate.

Figure 7B:
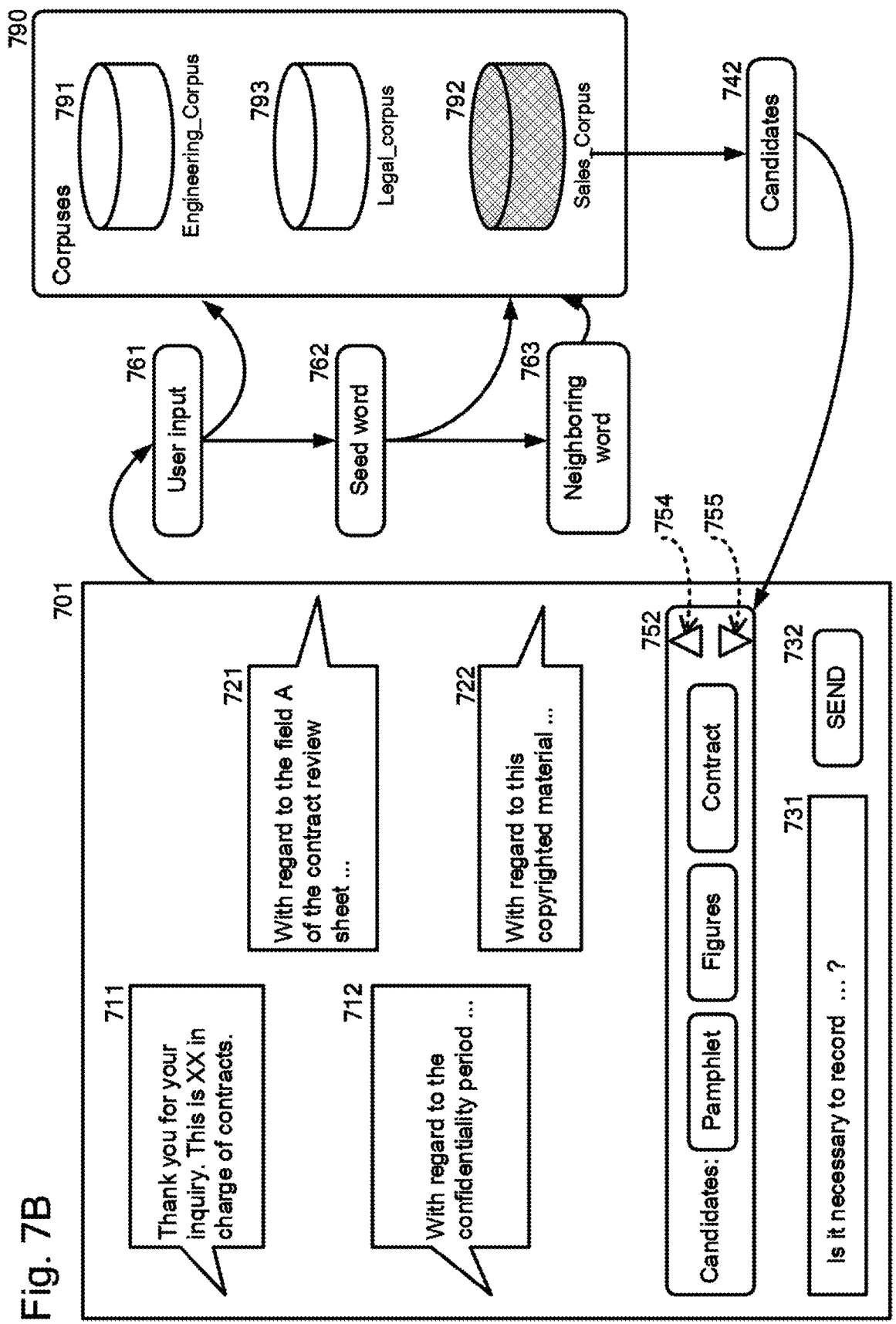
FIG. 7B illustrates a diagram of suggesting a plurality of output candidates after a corpus to be used is changed, in accordance with an embodiment of the present invention.

With reference now to FIG. 7B, FIG. 7B illustrates a diagram of suggesting a plurality of output candidates after a corpus to be used is changed, in accordance with an embodiment of the present invention.

Let us suppose that the user pushes the icon (754) and the corpus was changed to Sales_Corpus (792), the system newly suggests, on the basis of the seed word (762), "record", the following three keywords as output candidates (742): "Pamphlet", "Figures" and "Contract" with reference to Sales_Corpus (792) and then sends these output candidates (742) to the device in order to suggest these output candidates (742) to the user.

After the receipt of these output candidates (742), the device displays these received output candidates (752) on a display.

During input of the sentence (731), the user can select a candidate among these output candidates (752) and then the selected candidate is copied to the sentence that the user is now entering. After the user finishes entering the sentence including the selected output candidate, the user may press the icon "SEND" (732) to upload this sentence to the chat system.

According to the aforesaid embodiment of the present invention, the user can select a corpus to be used and therefore input a sophisticated, elegant or refined word which is selected based on the corpus selected by the user. Accordingly, the aforesaid embodiment makes it possible for the user to use a wide variety of vocabularies, idioms, and phraseology of the text creators, supporting creation of more distinct and characteristic texts.

Figure 8C:
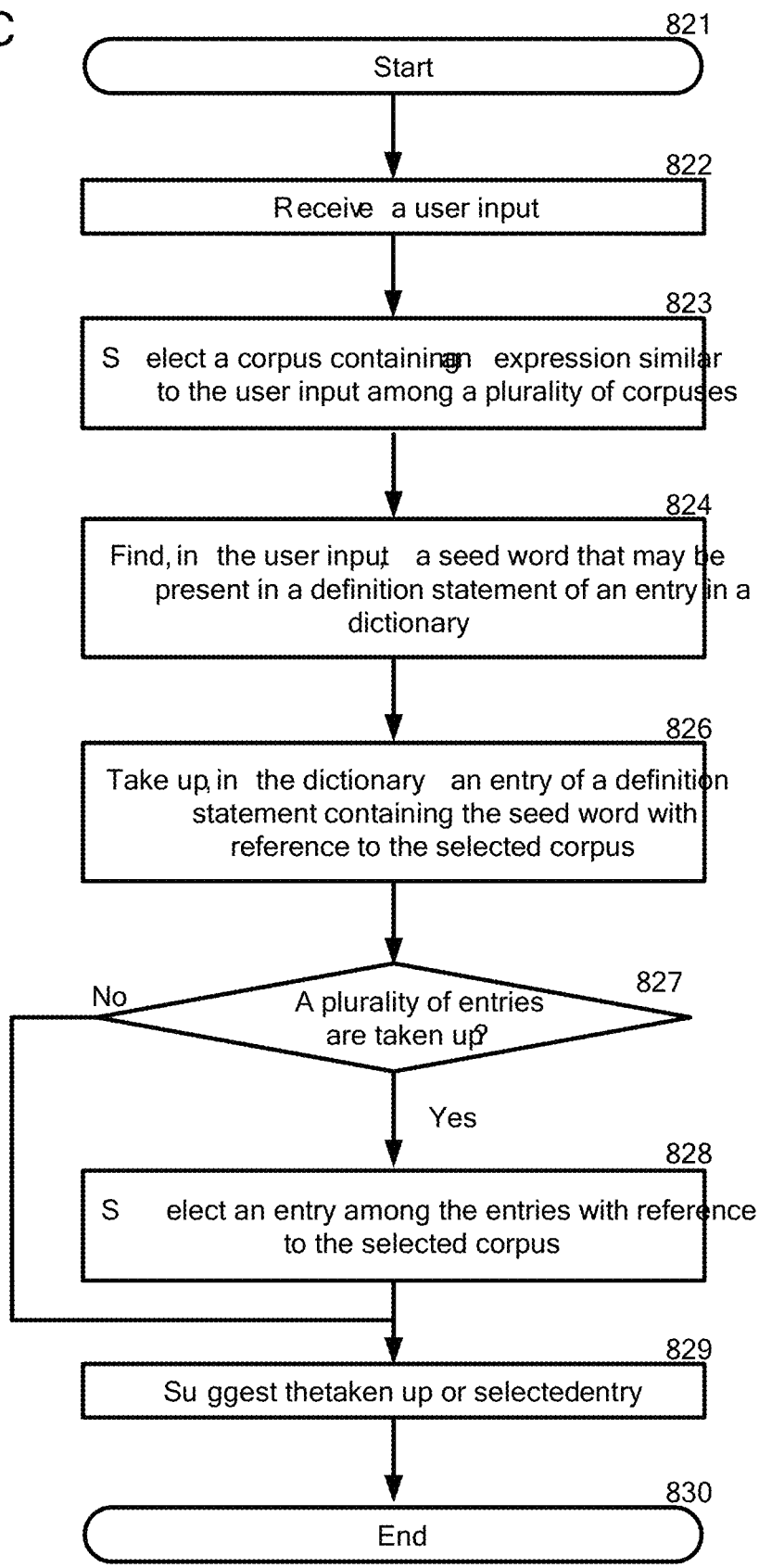
FIG. 8C illustrates a flowchart depicting a process for suggesting an output candidate, on the basis of a seed word which was found in a user input, in accordance with an embodiment of the present invention.

The following FIGS. 8A and 8B each illustrate a flowchart depicting a process for preparing a lexicon index. The following FIGS. 8C and 8D each illustrate a flowchart depicting a process for suggesting an output candidate. The following FIGS. 8E to 8G each illustrate an optional flowchart depicting a process for suggesting an output candidate. A system such as a computer system mentioned below may be the same or different from the system (101) described in FIG. 1.

With reference now to FIG. 8A, FIG. 8A illustrates a flowchart depicting a process for preparing a lexicon index from a dictionary, in accordance with an embodiment of the present invention.

At step 801, the system starts the aforesaid process.

At step 802, the system collects a dictionary which is electronically stored. The dictionary has at least one set of an entry and a definition sentence of the entry or that has entries and definition statements of the entries. A type of the dictionary may be selected according to an environment where an embodiment of the present invention is used.

At step 804, the system breaks down the definition sentence in the dictionary into a word(s) and then extracts a word(s) which may be used as a definition word(s). The extraction of a word(s) can be carried out, for example, but not limited to, a text mining technology.

At step 805, the system associates the definition word(s) with the entry to prepare a lexicon index.

At step 806, the system terminates the aforesaid process. The obtained lexicon index may be used as a dictionary in accordance with an embodiment of the present invention.

With reference now to FIG. 8B, FIG. 8B illustrates another flowchart depicting a process for preparing a lexicon index from texts of past or historical writers to be referred to, in accordance with an embodiment of the present invention.

At step 811, the system starts the aforesaid process.

At step 812, the system collects texts written by past or historical writers to be referred to.

At step 813, the system collects data such as definition statement which associates a word(s) or expression(s) which appears in the collected text with a daily-used word(s) or expression(s). The data can be found in any dictionary available in a market, any dictionary on the Internet or Intranet or any dictionary used in a limited environment, such as in a certain organization, for example, a company, department, school or government.

At step 814, the system breaks down the collected data into a word(s) and extract the word(s) used for a definition word(s). The extraction of a word(s) can be carried out, for example, but not limited to, a text mining technology.

At step 815, the system associates the definition word(s) with the entry to prepare a lexicon index.

At step 816, the system terminates the aforesaid process. The obtained lexicon index may be used in an embodiment of the present invention.

With reference now to FIG. 8C, FIG. 8C illustrates a flowchart depicting a process for suggesting an output candidate, on the basis of a seed word which was found in a user input, in accordance with an embodiment of the present invention.

At step 821, the system starts the aforesaid process.

At step 822, the system receives a user input. The user input may be carried out, for example, by inputting a sentence through a hardware or software keyboard or a voice input. The system may analysis an expression.

At step 823, the system selects a corpus containing an expression similar to the user input among a plurality of corpuses. A plurality of corpuses may be provided according to an environment where an embodiment of the present invention is carried out. The corpus may be prepared, for example, but not limited to, according to a various vocabulary-level of a user, various profiles of a user or a combination thereof.

At step 824, the system finds, in the user input, a seed word that may be present in a definition statement of an entry in a dictionary. The dictionary may be in advance loaded in to a memory in the system. The dictionary may be one described above. The seed word may be, for example, a noun.

At step 826, the system extracts, in the dictionary, an entry of a definition statement containing the seed word or having a high similarity to the seed word with reference to the selected corpus. The system may extract one or more entries in the dictionary.

In a case where a plurality of seed words are taken up, the system may repeat step 826 for each seed word or proceed to steps described in FIG. 8E in which a process for allowing a user to select one seed word among a plurality of seed words is illustrated.

At step 827, the system judges whether a plurality of entries are taken up or not. If the judgment is positive, the system proceeds to step 828. If the judgment is negative, the system proceeds to step 829.

At step 828, the system selects an entry among the taken up entries with reference to the selected corpus. The selected corpus may be used for selecting an entry among the taken up entries. The system may choose an entry which is included in the selected corpus.

At step 829, the system suggests, as an output candidate, the taken up entry obtained in step 826 or the selected entry obtained in step 828.

At step 830, the system terminates the aforesaid process. The suggested entry can be presented on a display associated with a user, such as on a display of a computer, smartphone or tablet.

Figure 8D:
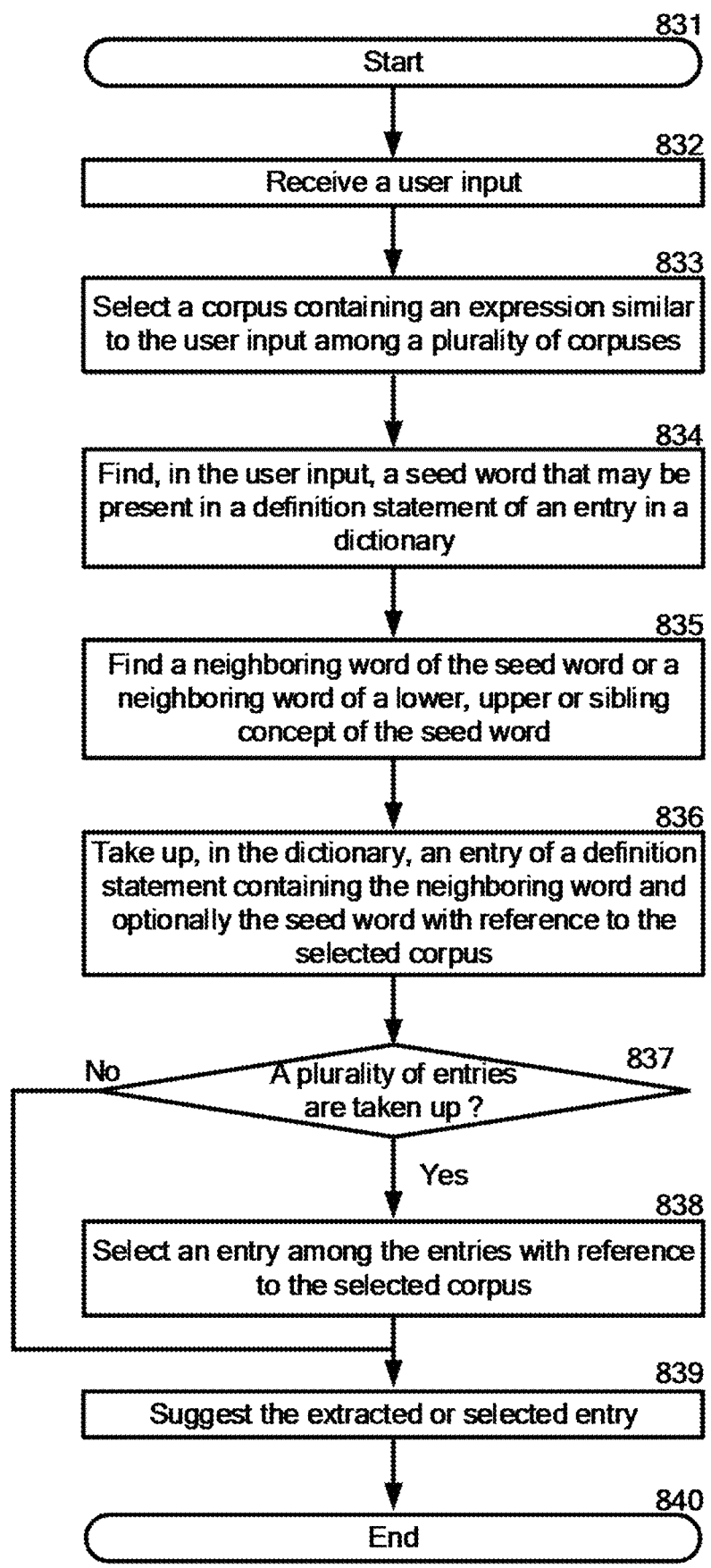
FIG. 8D illustrates a flowchart depicting process for suggesting an output candidate on the basis of a neighboring word of a seed word which was found in a user input, in accordance with an embodiment of the present invention.

With reference now to FIG. 8D, FIG. 8D illustrates another flowchart depicting a process for suggesting an output candidate on the basis of a neighboring word of a seed word which was found in a user input, in accordance with an embodiment of the present invention.

At step 831, the system starts the aforesaid process.

Steps 832 to 834 correspond to steps 822 to 824 described in FIG. 8C, respectively, and therefore detailed explanation of Steps 832 to 834 will be omitted herein.

At step 835, the system finds a neighboring word of the seed word or a neighboring word of a lower, upper or sibling concept of the seed word.

In a case where a plurality of seed words are taken up, the system may repeat step 835 for each seed word or proceed to a process steps described in FIG. 8E in which a process for allowing a user to select one seed word among a plurality of seed words is illustrated.

At step 836, the system extracts, in the dictionary, an entry of a definition statement containing the neighboring word or having a high similarity to the neighboring word and optionally the seed word with reference to the selected corpus.

Steps 837 to 839 correspond to steps 827 to 829 described in FIG. 8C, respectively, and therefore detailed explanation of Steps 837 to 839 will be omitted herein.

At step 840, the system terminates the aforesaid process. The suggested entry can be presented on a display associated with a user, such as on a display of a computer, smartphone or tablet.

With reference now to FIG. 8E, FIG. 8E illustrates a flowchart depicting a process for allowing a user to select one seed word among a plurality of seed words which was found in a user input, in accordance with an embodiment of the present invention.

At step 841, the system starts the aforesaid process after step 824 described in FIG. 8C or step 834 described in FIG. 8D.

At step 842, the system judges whether a plurality of seed words are found or not. If the judgment is positive, the system proceeds to step 843. If the judgment is negative, the system proceeds to the final step 844 in order to terminate the aforesaid process.

At step 843, the system allows a user to select one seed word among the found seed words. The system can display the found seed words on a display associated with the user, such as on a display of a computer, smartphone or tablet. The user can select one seed word among the found seed words, for example, selecting one seed word by clicking this seed word.

At step 844, the system terminates the aforesaid process, and then proceed to step 826 described in FIG. 8C or step 835 described in FIG. 8D.

With reference now to FIG. 8F, FIG. 8F illustrates a flowchart depicting a process for suggesting an output candidate when another corpus is selected, in accordance with an embodiment of the present invention.

At step 851, the system starts the aforesaid process, for example, after step 829 described in FIG. 8C or step 839 described in FIG. 8D.

At step 852, the system judges whether another corpus is selected or not. If the judgment is positive, the system proceeds to step 853. If the judgment is negative, the system proceeds to the final step 854 in order to terminate the aforesaid process.

At step 853, the system replaces the present corpus with the another selected corpus.

At step 854, the system terminates the aforesaid process, and then proceeds to step 824 described in FIG. 8C in order to repeat steps 824 to 829 described in FIG. 8C or step 834 described in FIG. 8D in order to repeat step 834 to 839 described in FIG. 8D.

With reference now to FIG. 8G, FIG. 8G illustrates a flowchart depicting a process for replace a seed word that present in a user input with an output candidate or a suggested entry.

At step 861, the system starts the aforesaid process, for example, after step 829 described in FIG. 8C or step 839 described in FIG. 8D.

At step 862, the system judges whether the seed word in the user input is to be replaced with the suggested entry. The judgment is made, for example, when a user selects an option for such replacement. If the judgment is positive, the system proceeds to step 863. If the judgment is negative, the system proceeds to the final step 865 in order to terminate the aforesaid process.

At step 863, the system replaces the seed word in the user input with the suggested entry.

At step 864, the system outputs the user input after the replacement. The output may be carried out by displaying the user input after the replacement on a display associated with the user, such as on a display of a computer, smartphone or tablet.

At step 865, the system terminates the aforesaid process.

Figure 9:
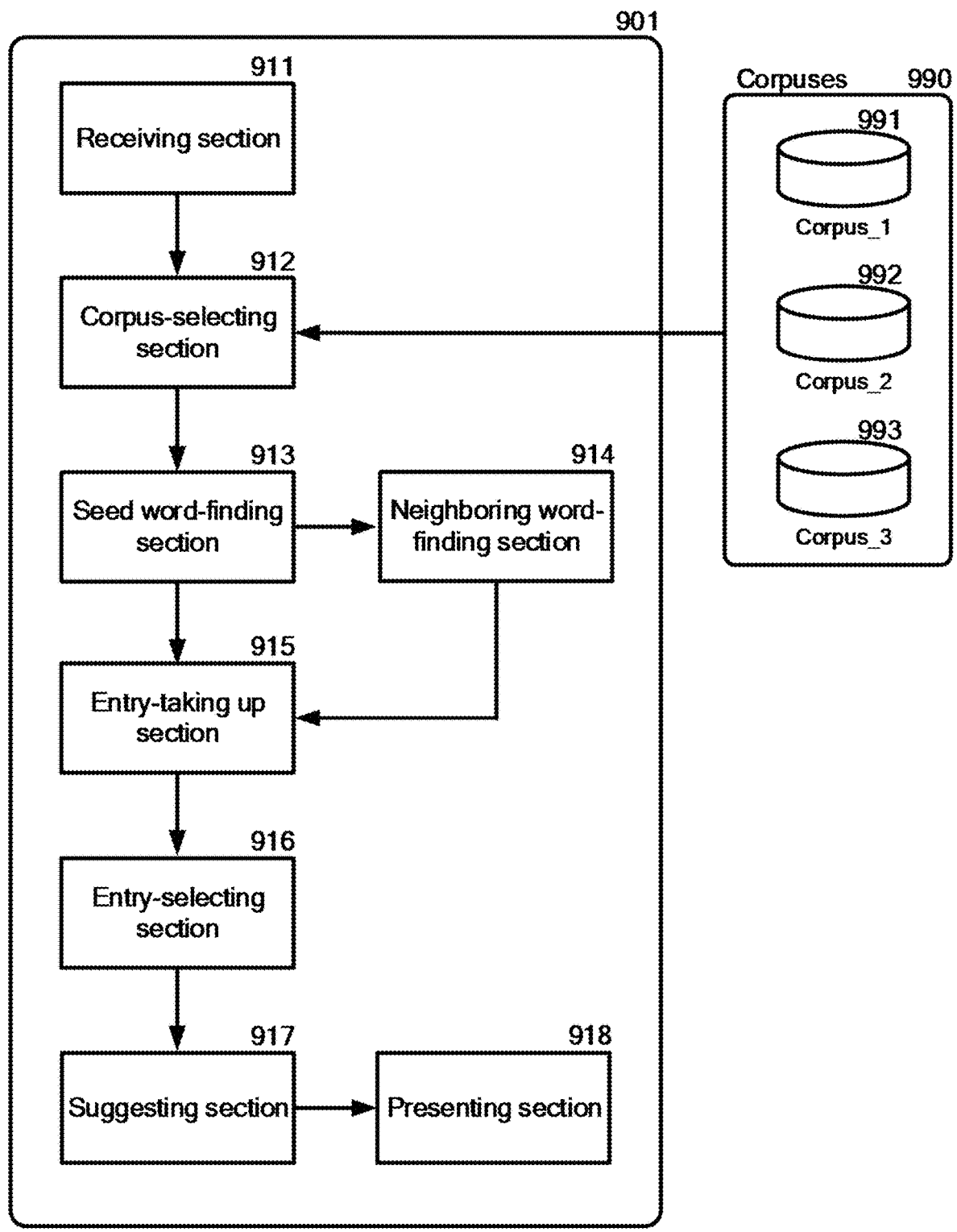
FIG. 9 illustrates an overall functional block diagram of depicting a system hardware in relation to the process of FIGS. 8A to 8G, in accordance with an embodiment of the present invention.

With reference now to FIG. 9, FIG. 9 illustrates an overall functional block diagram of depicting a system hardware in relation to the process of FIGS. 8A to 8G, in accordance with an embodiment of the present invention.

The system (901) may correspond to the system (101) described in FIG. 1.

The system (901) may comprise a receiving section (911), a corpus-selecting section (912), a seed-word-finding section (913), an entry-taking up section (915) and a suggesting section (917). The system (901) may further comprise a neighboring word-finding section (914), an entry-selecting section (916), a presenting section (918) or a combination thereof.

The receiving section (911) receives a user input. The user input may be sent from a device associated with a user.

The receiving section (911) may perform step 822 described in FIG. 8C and step 832 described in FIG. 8D.

The corpus-selecting section (912) selects a corpus containing an expression similar to the user input among a plurality of corpuses. The corpus-selecting section (912)

may select a corpus by carried out on the basis of a vocabulary level of a user, a profile of a user or a combination thereof. The corpus-selecting section (912) may allow a user to change the selected corpus to another corpus among the plurality of corpuses.

The corpus-selecting section (912) may perform step 823 described in FIG. 8C and step 833 described in FIG. 8D.

The seed-word-finding section (913) finds, in the user input, a seed word that may be present in a definition statement of an entry in a dictionary. In a case where a plurality of seed words are taken up, the seed-word-finding section (913) allows the user to select one seed word among the taken up seed words.

The seed-word-finding section (913) may perform step 824 described in FIG. 8C, step 834 described in FIG. 8D and steps 842 and 843 described in FIG. 8E.

The neighboring word-finding section (914) finds a neighboring word of the seed word or a neighboring word of a lower, upper or sibling concept of the seed word.

The neighboring word-finding section (914) may perform step 835 described in FIG. 8D.

The entry-taking up section (915) extracts, in the dictionary, an entry of a definition statement containing the seed word or having a high similarity to the seed word with reference to the selected corpus. In a case where a neighboring word is found by the neighboring word-finding section (914), the entry-taking up section (915) extracts an entry of a definition statement containing the neighboring word or having a high similarity to the neighboring word, instead of or together with the taking up of an entry of a definition statement containing the seed word or having a high similarity to the seed word.

The entry-taking up section (915) may perform step 826 described in FIG. 8C, step 836 described in FIG. 8D and steps 852 and 856 described in FIG. 8F.

The entry-selecting section (916) selects an entry among the taken up entries with reference to the selected corpus if a plurality of entries are taken up.

The entry-selecting section (916) may perform steps 827 and 828 described in FIG. 8C, steps 837 and 838 described in FIG. 8D and steps 857 and 858 described in FIG. 8F.

The suggesting section (917) suggests the taken up entry as an output candidate.

The suggesting section (917) may perform step 829 described in FIG. 8C, step 839 described in FIG. 8D, and step 859 described in FIG. 8F.

The presenting section (918) presents the taken up entry to a user. The presenting section (918) may replace the seed word in the user input with the suggested entry and output the user input after the replacement. The suggesting section (917) may replace the seed word in the user input with the entry suggested by the suggesting section (917).

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
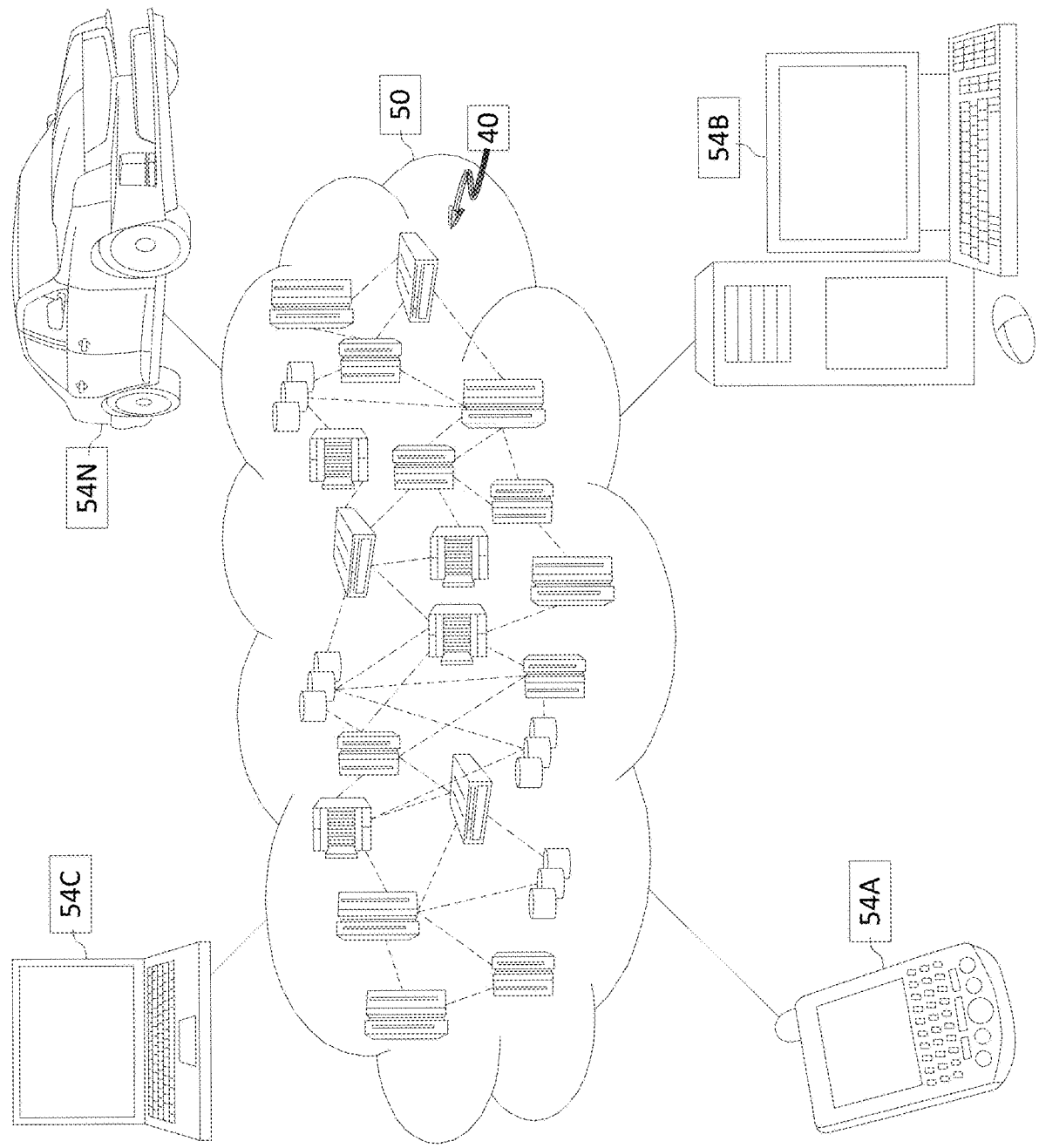
FIG. 10 depicts a cloud computing environment, in accordance with the exemplary embodiments.

Referring now to FIG. 10, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 40 and cloud computing environment 50 can communicate with any type of computerized device over any type of network and/or network addressable connection (e.g., using a web browser).

Figure 11:
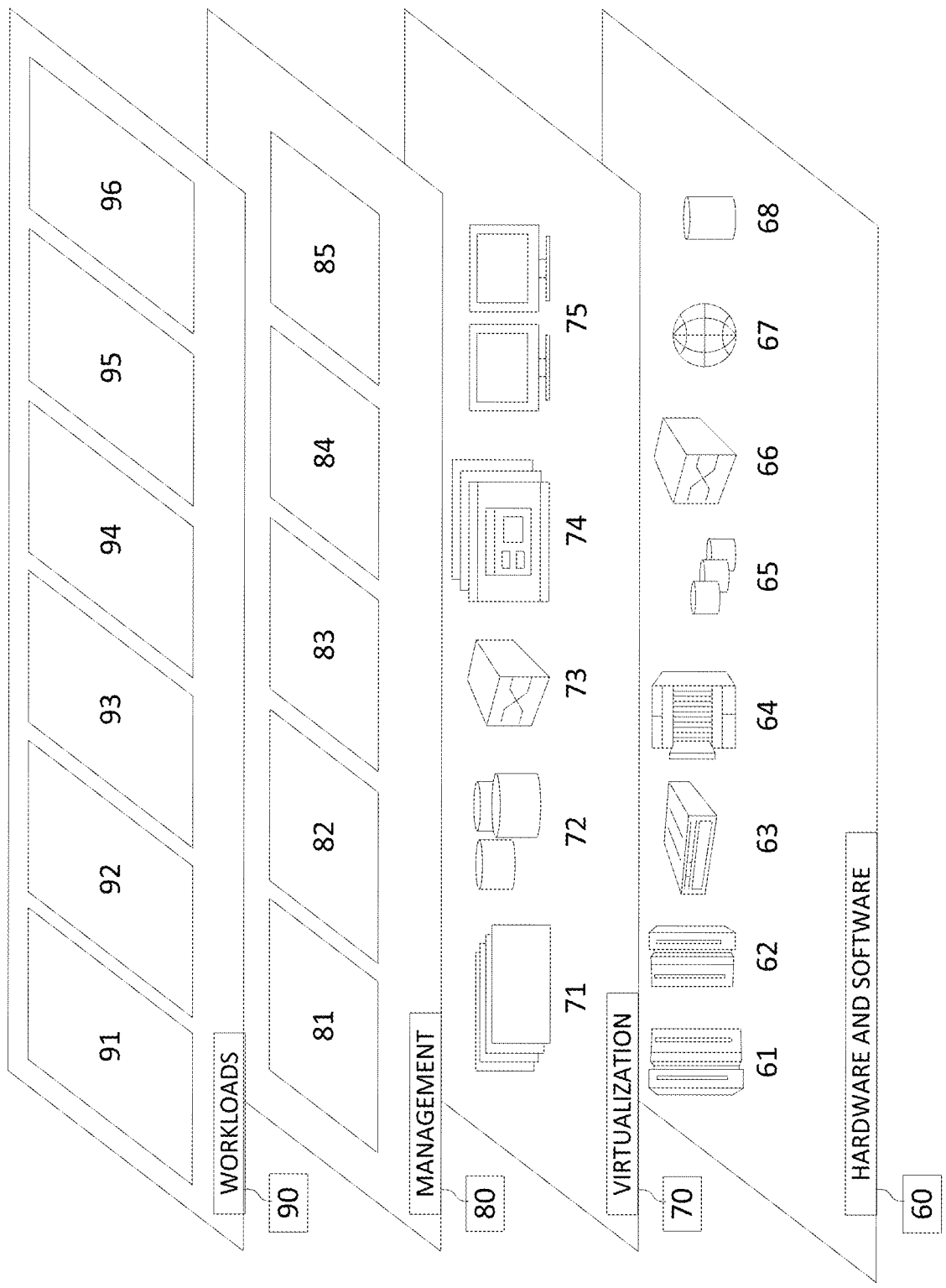
FIG. 11 depicts abstraction model layers, in accordance with the exemplary embodiments.

Referring now to FIG. 11, a set of functional abstraction layers provided by cloud computing environment 50 (FIG. 10) is shown. It should be understood in advance that the components, layers, and functions shown in FIG. 11 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and vocabulary processing 96.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for suggesting an output candidate, the method comprising:
   receiving a user input;
   identifying a vocabulary level of the user based on the user input;
   selecting a corpus containing an expression similar to the user input among a plurality of corpuses, wherein a vocabulary level of the corpus is above a vocabulary level corresponding to the expression similar to the user input, and wherein similarity is determined based on a shared context between the selected corpus and the user input;
   selecting, in the user input, a seed word that may be present in a definition statement of an entry in a dictionary;
   selecting in the user input, a neighboring word of the seed word, wherein the neighboring word is within a threshold word distance from the seed word;
   identifying, in the dictionary, and based on the selected corpus, an entry having a definition statement containing: (a) the seed word, or a word within a threshold similarity to the seed word, (b) and the neighboring word, or a word within a threshold similarity to the neighboring word; and
   suggesting the identified entry as an output candidate.

2. The method according to claim 1, the method further comprising:
   selecting a neighboring word of a lower, upper, or sibling concept of the seed word, wherein the identifying of an entry is carried out by:
   (a) identifying an entry of a definition statement containing: (i) the neighboring word of the lower, upper, or sibling concept of the seed word, or (ii) a word within a threshold similarity to the neighboring word of the lower, upper, or sibling concept of the seed word, together with (b) the identification of an entry of a definition statement containing (i) the seed word or (ii) a word within a threshold similarity to the seed word.

3. The method according to claim 1, the method further comprising:
   if a plurality of entries are identified within the dictionary based on the seed word and the neighboring word, selecting an entry among the identified entries based on the selected corpus, wherein the suggestion of the entry is carried out by suggesting the selected entry instead of the identified entries.

4. The method according to claim 2, the method further comprising:
   if a plurality of entries are identified within the dictionary based on the seed word and the neighboring word, selecting an entry among the identified entries based on the selected corpus, wherein the suggestion of the entry is carried out by suggesting the selected entry instead of the identified entries.

5. The method according to claim 1, wherein the selection of the corpus is carried out on the additional basis of a profile of a user.

6. The method according to claim 5, wherein the selected corpus is one associated with the profile.

7. The method according to claim 1, the method further comprising:
if a plurality of seed words are identified, allowing the user to select one seed word among the identified seed words.

8. The method according to claim 1, the method further comprising:
replacing the seed word in the user input with the suggested entry and outputting the user input after the replacement.

9. The method according to claim 1, the method further comprising:
in response to a receipt of a further user input, repeating the selecting a seed word from the further user input to select a second seed word; identifying, in the dictionary, and based on the selected corpus, an entry of a definition statement containing the second seed word or a word within a threshold similarity to the seed word; and suggesting the entry identified based on the second seed word as an output candidate.

10. The method according to claim 9, the method further comprising:
allowing a user to change the selected corpus to another corpus among the plurality of corpuses.

11. The method according to claim 10, wherein the identifying of the entry based on the second seed word is carried out with reference to the other corpus in response to the change of the selected corpus to the other corpus.

12. The method according to claim 1, wherein the dictionary has one or more definition words instead of the definition statement; the one or more definition words are associated with an entry of the definition statement; and the identifying of an entry is carried out by identifying an entry associated with a definition word common with the seed word.

13. A system, comprising:
one or more processors; and
a memory storing a program which performs, on the processor, an operation of suggesting an output candidate, the operation comprising:
receiving a user input;
identifying a vocabulary level of the user based on the user input;
selecting a corpus containing an expression similar to the user input among a plurality of corpuses, wherein a vocabulary level of the corpus is above a vocabulary level corresponding to the expression similar to the user input, and wherein similarity is determined based on a shared context between the selected corpus and the user input;
selecting, in the user input, a seed word that may be present in a definition statement of an entry in a dictionary;
selecting in the user input, a neighboring word of the seed word, wherein the neighboring word is within a threshold word distance from the seed word;
identifying, in the dictionary, and based on the selected corpus, an entry having a definition statement containing: (a) the seed word, or a word within a threshold similarity to the seed word, (b) and the neighboring word, or a word within a threshold similarity to the neighboring word; and
suggesting the identified entry as an output candidate.

14. The system according to claim 13, the operation further comprising:
selecting a neighboring word of a lower, upper, or sibling concept of the seed word, wherein the identifying of an entry is carried out by:
(a) identifying an entry of a definition statement containing: (i) the neighboring word of the lower, upper, or sibling concept of the seed word, or (ii) a word within a threshold similarity to the neighboring word of the lower, upper, or sibling concept of the seed word,
together with (b) the identification of an entry of a definition statement containing (i) the seed word or (ii) a word within a threshold similarity to the seed word.

15. The system according to claim 13, the operation further comprising:
if a plurality of entries are identified within the dictionary based on the seed word and the neighboring word, selecting an entry among the identified entries based on the selected corpus, wherein the suggestion of the entry is carried out by suggesting the selected entry instead of the identified entries.

16. The system according to claim 14, the operation further comprising:
if a plurality of entries are identified within the dictionary based on the seed word and the neighboring word, selecting an entry among the identified entries based on the selected corpus, wherein the suggestion of the entry is carried out by suggesting the selected entry instead of the identified entries.

17. A computer program product for suggesting an output candidate, the computer program product comprising a computer readable storage medium having program instructions embodied therewith, the program instructions executable by a computer to cause the computer to perform a method comprising:
receiving a user input;
identifying a vocabulary level of the user based on the user input;
selecting a corpus containing an expression similar to the user input among a plurality of corpuses, wherein a vocabulary level of the corpus is above a vocabulary level corresponding to the expression similar to the user input, and wherein similarity is determined based on a shared context between the selected corpus and the user input;
selecting, in the user input, a seed word that may be present in a definition statement of an entry in a dictionary;
selecting in the user input, a neighboring word of the seed word, wherein the neighboring word is within a threshold word distance from the seed word;
identifying, in the dictionary, and based on the selected corpus, an entry having a definition statement containing: (a) the seed word, or a word within a threshold similarity to the seed word, (b) and the neighboring word, or a word within a threshold similarity to the neighboring word; and
suggesting the identified entry as an output candidate.

18. The computer program product according to claim 17, the method further comprising:
selecting a neighboring word of a lower, upper, or sibling concept of the seed word, wherein the identifying of an entry is carried out by:

(a) identifying an entry of a definition statement containing: (i) the neighboring word of the lower, upper, or sibling concept of the seed word, or (ii) a word within a threshold similarity to the neighboring word of the lower, upper, or sibling concept of the seed word, together with (b) the identification of an entry of a definition statement containing (i) the seed word or (ii) a word within a threshold similarity to the seed word.

19. The computer program product according to claim 17, the method further comprising:
if a plurality of entries are identified within the dictionary based on the seed word and the neighboring word, selecting an entry among the identified entries based on the selected corpus, wherein the suggestion of the entry is carried out by suggesting the selected entry instead of the identified entries.

20. The computer program product according to claim 18, the method further comprising:
if a plurality of entries are identified within the dictionary based on the seed word and the neighboring word, selecting an entry among the identified entries based on the selected corpus, wherein the suggestion of the entry is carried out by suggesting the selected entry instead of the identified entries.

\* \* \* \* \*